(12) United States Patent
Sommer et al.

(10) Patent No.: US 12,670,773 B2
(45) Date of Patent: Jun. 30, 2026

(54) TRUST-BASED BAG CHECKS IN A RETAIL ENVIRONMENT

(71) Applicant: Target Brands, Inc., Minneapolis, MN (US)

(72) Inventors: Ethan Sommer, Minneapolis, MN (US); Christopher Brakob, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 253 days.

(21) Appl. No.: 18/309,869

(22) Filed: May 1, 2023

(65) Prior Publication Data

US 2023/0386306 A1 Nov. 30, 2023

Related U.S. Application Data

(60) Provisional application No. 63/346,772, filed on May 27, 2022.

(51) Int. Cl.
*G07G 1/00* (2006.01)
*G06Q 20/20* (2012.01)
*G06Q 20/40* (2012.01)
*G06Q 30/0201* (2023.01)

(52) U.S. Cl.
CPC ......... *G07G 1/0036* (2013.01); *G06Q 20/206* (2013.01); *G06Q 20/4016* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 7,673,797 B2 | 3/2010 | Edwards | |
| 7,822,631 B1 * | 10/2010 | Vander Mey .... | G06Q 10/06395 705/7.41 |
| 10,387,817 B2 | 8/2019 | Kellstrand et al. | |
| 10,496,946 B2 | 12/2019 | Geffert et al. | |
| 2008/0147511 A1 * | 6/2008 | Edwards ............. | G06Q 20/206 705/18 |
| 2014/0063262 A1 * | 3/2014 | Edwards ........... | G06Q 20/4016 705/16 |
| 2019/0287113 A1 * | 9/2019 | Wright ................ | G06K 7/1417 |
| 2021/0158354 A1 * | 5/2021 | Apps ................. | G06Q 20/3226 |
| 2024/0104569 A1 * | 3/2024 | Turumella ........ | G06Q 30/0613 |

* cited by examiner

*Primary Examiner* — Ariel J Yu
(74) *Attorney, Agent, or Firm* — Barnes & Thornburg LLP

(57) ABSTRACT

The disclosed technology provides for determining whether to audit a shopper in a retail environment based on a trust score assigned to the shopper. A method can include receiving, by a computer system, shopper information including an identifier for the shopper, retrieving bag checkout history data associated with the shopper based on the identifier, which includes the shopper's trust score, determining a weighted probability score for the shopper based on the trust score and shopper trust score groupings, determining, using a randomization process, whether to perform a bag check on the shopper based on the weighted probability score, returning bag check instructions based on the determination, receiving bag check data from performing the bag check after the shopper completes checkout, adjusting the trust score based on the bag check history data and the bag check data, and providing the adjusted shopper trust score for use in the shopper's subsequent visits.

6 Claims, 9 Drawing Sheets

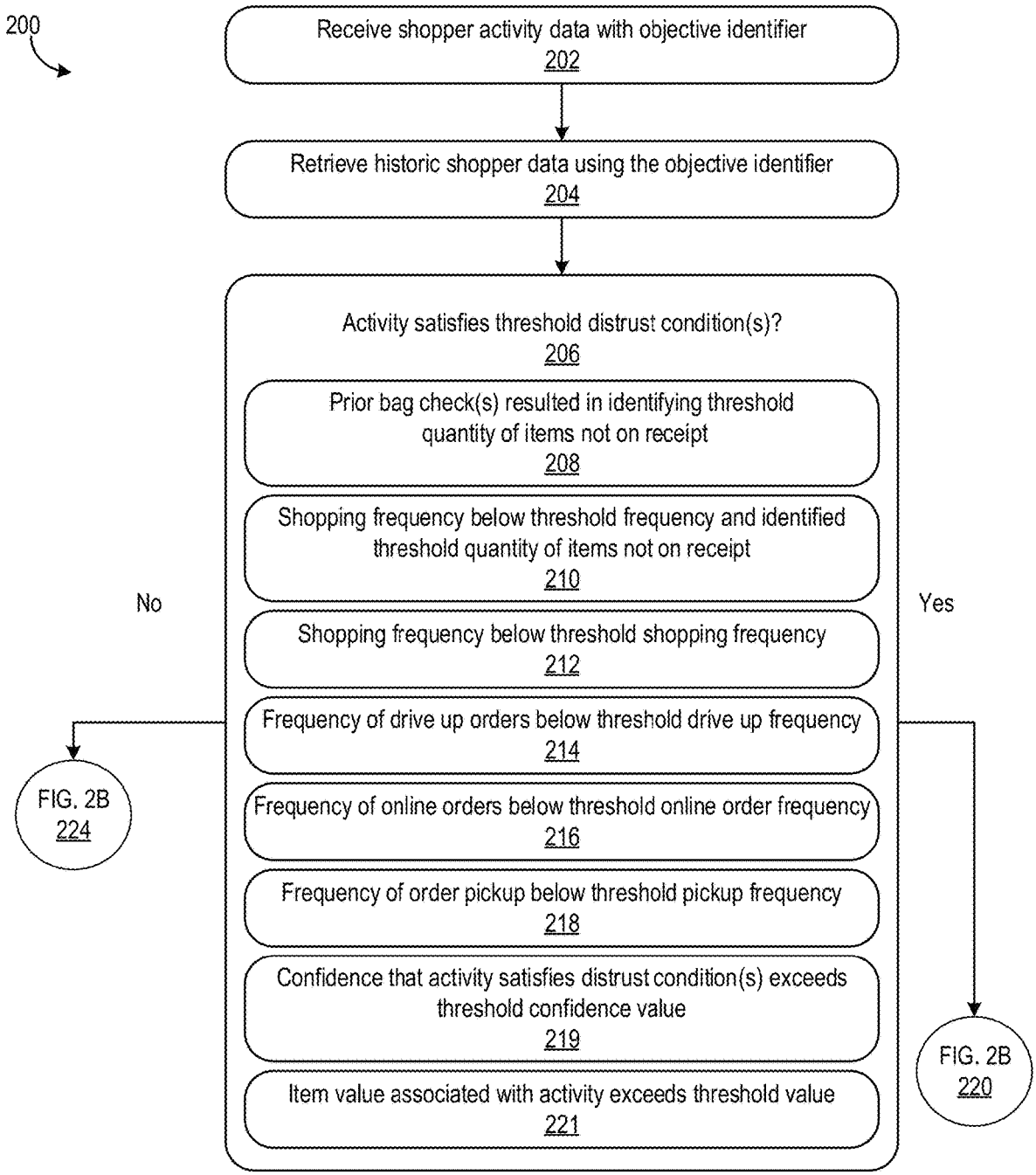

200

Receive shopper activity data with objective identifier
202

Retrieve historic shopper data using the objective identifier
204

Activity satisfies threshold distrust condition(s)?
206

Prior bag check(s) resulted in identifying threshold
quantity of items not on receipt
208

Shopping frequency below threshold frequency and identified
threshold quantity of items not on receipt
210

Shopping frequency below threshold shopping frequency
212

Frequency of drive up orders below threshold drive up frequency
214

Frequency of online orders below threshold online order frequency
216

Frequency of order pickup below threshold pickup frequency
218

Confidence that activity satisfies distrust condition(s) exceeds
threshold confidence value
219

Item value associated with activity exceeds threshold value
221

No

Yes

Shopper Bag Check History 300

| | 1st bag check | 3rd bag check | 7th bag check | 15th bag check | 17th bag check | 21st bag check |
|---|---|---|---|---|---|---|
| Shopper A | Checked bag Item(s) match Score = 50 | Checked bag Item(s) match Score = 53 | Checked bag Item(s) match Score = 60 | No bag check Score = 60 | No bag check Score = 60 | Checked bag Item(s) match Score = 67 |
| Shopper B | Checked bag Item(s) match Score = 50 | Checked bag Item(s) match Score = 53 | Checked bag Item(s) mismatch Score = 40 | Checked bag Item(s) match Score = 42 | Checked bag Item(s) match Score = 49 | Checked bag Item(s) match Score = 54 |

FIG. 3A

TRUST-BASED BAG CHECKS IN A RETAIL ENVIRONMENT

INCORPORATION BY REFERENCE

This application claims priority to U.S. Provisional Application Ser. No. 63/346,772, filed on May 27, 2022, the disclosure of which is incorporated by reference in its entirety.

TECHNICAL FIELD

This document generally describes technology related to determining whether and when to check shoppers' bags, such as at an exit in a physical retail store.

BACKGROUND

A retail environment, such as a physical store, can sell items of varying types and categories. Shoppers, or other customers, can walk around the retail environment and pick items off shelves that they desire to purchase. When a shopper is done collecting the items they wish to purchase, the shopper can go through a checkout process in the retail environment. The retail environment can include a checkout area near an exit or exits of the retail environment. The checkout area can include checkout lanes in which an employee of the retail environment scans the items that the shopper is purchasing. This can be a manual checkout lane. The checkout area can also include self-checkout stations. The self-checkout stations can include scanning devices that the shopper can use to scan the items they are purchasing and complete a checkout process on their own. Sometimes, a checkout process can be completed without having to go through the checkout area in the retail environment. For example, the shopper can order the items online and complete the transaction online (e.g., pay for the items). Then, the shopper can show up at the retail environment to pick up the items that they ordered. The shopper can pick up the items as a drive up order or by entering the retail environment.

Sometimes, customers can enter the retail environment, pick items off the shelves, and exit the retail environment without paying for one or more of those items. In other words, a customer can steal one or more items from the retail environment without paying for the item(s). Sometimes, customers can go through a checkout process but may scan, or otherwise pay for, at a self-checkout station, only some of the items that they picked off the shelves. Sometimes, customers can enter the manual checkout lane and sweetheart the employee working there to avoid scanning and paying for one or more of the items. These actions can cause shortages in the retail environment.

SUMMARY

The document generally relates to technology for performing trust-based audits of shoppers in physical retail environments. More particularly, the disclosed technology provides for determining when to check (e.g., audit) a shopper's bag(s), cart, and/or basket based on a trust score assigned to the shopper. The trust score can be a numeric value indicating a level of confidence that the shopper's tally of items in their bag is accurate. Confidence, or trust, can be earned or lost based on activity that is attributed to the shopper during prior shopping experiences at the retail environment. For example, the shopper's trust score can increase if, during prior bag checks, items in the shopper's bag(s) matched items on their receipt(s). The retail environment can maintain and update trust scores for shoppers over time, which can serve as a proxy for confidence that the shopper's tally of items they have purchased, which may be included on a paper and/or electronic receipt, is accurate (e.g., does not include additional items, different quantities than purchased, and/or different items than purchased). As another example, the shopper's trust score can decrease if during prior bag checks, items in the shopper's bag(s) did not match items on their receipt(s). The lower trust score can indicate a lower level of confidence that a tally of the items purchased by the shopper correlates to a tally of items that the shopper has in their possession when they leave the retail environment (which can include items the shopper purchased as well as items the shopper might not have paid for). The disclosed technology can then leverage the shopper's trust score to determine when to perform a bag check for the shopper. The higher the trust score, the more trustworthy the shopper, and the less frequently the shopper's bags may be checked. The lower the trust score, the less confident that the shopper's tally of items in their bags is accurate, and the more frequently the shopper's bags may be checked.

Each shopper can start with a baseline quantity of bag checks (e.g., audits). Over time, a frequency of bag checks associated with the shopper can be dynamically adjusted based on the shopper's trust score, which can be increased or decreased depending on results from prior bag checks. Moreover, bag checks can be randomly offset such that the bag checks occur less frequently and/or are less predictable. The bag checks can be randomly offset based on whether the shopper's trust score satisfies a threshold trust criteria. In some implementations, bag check frequency can be dynamically increased and/or reset to the baseline frequency once the shopper's trust score meets a threshold distrust criteria (e.g., as a result of finding that the shopper's tally of items identified in a prior bag check does not match items identified on the shopper's receipt).

As described herein, the shopper's trust score can be adjusted based on activity attributed to the shopper when they visit the retail environment. Such activity can include results from checking the shopper's bag(s) after a checkout process (e.g., a current checkout process and/or past checkout processes at the retail environment) and before the shopper exits the retail environment. If a bag, for example, contains all the items on the shopper's receipt, their trust score can increase since the shopper is more likely paying for all the items they are purchasing. On the other hand, if the bag contains items that are not on the shopper's receipt, their trust score can decrease more quickly that it may increase. The trust score can decrease because the shopper may not be paying for all the items that they are leaving the retail environment with. The trust score can increase slowly over time as the shopper builds trust with the retail environment but can decrease more quickly depending on frequency and type of activities attributed to the shopper during prior shopping experiences at the retail environment.

The shopper's trust score can be used, in combination with one or more other factors including but not limited to historic shopper activity and/or some element of randomness, to designate the shopper for a particular exit procedure in the retail environment. For example, if the shopper's trust score is below a threshold trust level, the shopper can be designated for an exit procedure that includes checking their bag(s) during a current trip before exiting the retail environment. Results from this bag(s) check can also be used to update the shopper's trust score, as described herein. If the shopper's trust score is above the threshold trust level, the shopper can be routed through a direct exit of the retail environment. As a result, the shopper may not undergo a bag check before leaving the score because the shopper is trusted by the retail environment. However, the shopper may be directed to a bag check during a next shopping experience at the retail environment because of an element of randomness and/or their bag check frequency.

As an illustrative example, a shopper can use a scan-and-go process in the retail environment in which the shopper picks items off the shelves, then scans a barcode in a mobile application presented at their user devices to pay for the items at an audit station. The audit station can be a kiosk, self-checkout lane, etc. An identifier associated with the barcode can be used to retrieve a trust score associated with the user. If the trust score satisfies threshold distrust criteria, a determination can be made that the shopper's bags should be checked against their receipt before they exit the retail environment. A receipt can be printed with an indication directing the shopper to a bag check station/area before exiting the retail environment.

The disclosed technology can also provide for adjusting a frequency at which the shopper's bags are checked during subsequent trips. The frequency can be adjusted based on results from a bag check during a current trip (e.g., shopping experience) at the retail environment. The frequency can also be adjusted based on the shopper's trust score. For example, shoppers can be audited on their $1^{st}$, $3^{rd}$, and $7^{th}$ trips. If the shopper's bag contents match their receipt, the frequency of performing the audits in the future can decrease over time. For example, if a shopper's bag contents match a receipt during the $1^{st}$, $3^{rd}$, and $7^{th}$ trips, the shopper's bag check frequency can be lowered so that the shopper is not audited again until their $15^{th}$ trip to the retail environment. On the other hand, if the shopper's bag contents do not match the receipt on one or more of the $1^{st}$, $3^{rd}$, and $7^{th}$ trips, the shopper's bag check frequency can increase so that the shopper is audited on their $11^{th}$ and $13^{th}$ trips to the retail environment. At some point, once the shopper hits a threshold quantity of trips to the retail environment (e.g., 50 trips) and their trust score has not decreased, random offsetting can be used to make the shopper's future audits less predictable and/or less frequent.

Although this disclosure describes technology for determining when to check a shopper's bags, the disclosed technology can also be used to determine when to perform any other type of audit before the shopper leaves the retail environment. For example, the disclosed technology can be used to determine when to audit the shopper's cart and/or basket. Auditing the shopper's cart, basket, and/or bag can include counting a quantity of items therein. Auditing can also include looking for only items whose value exceeds a threshold value and seeing whether those items appear in the shopper's cart, basket, and/or bag but do not on the shopper's receipt. Auditing can also include looking for items that are classified or categorized as common or high shortage items (e.g., associated with the most shortages in the retail environment and/or a network of retail environments, typically involved in shortages in the retail environment, etc. over a predetermined period of time) that appear in the shopper's cart, basket, and/or bag but do not appear on the shopper's receipt. Auditing the shopper's cart, basket, and/or bag based on the shopper's trust score can also be based on one or more other auditing methods and/or criteria.

One or more embodiments described herein can include a method for determining whether to check a bag of a shopper based on a shopper trust score in a retail environment, the method including: receiving, by a computer system, shopper information including an identifier associated with a shopper, retrieving, by the computer system and from a data store, bag checkout history data associated with the shopper based on the identifier, the bag checkout history data including a shopper trust score, determining, by the computer system, a weighted probability score for the shopper based on the shopper trust score and one or more shopper trust score groupings, determining, by the computer system and using a randomization process, whether to perform a bag check on the shopper based on the weighted probability score, the weighted probability score indicating a probability that a randomly determined outcome from the randomization process identifies that the bag check is to be performed on the shopper, returning, by the computer system, bag check instructions based on the determination that the bag check is to be performed on the shopper, receiving, by the computer system, bag check data from performing the bag check on the shopper after the shopper completes a checkout process, the bag check data indicating whether contents of a shopper's bag match transaction data on a receipt of the shopper from the checkout process, adjusting, by the computer system, the shopper trust score based on the bag check history data and the bag check data, and providing, by the computer system, the adjusted shopper trust score for use in subsequent retail environment visits by the shopper.

In some implementations, the embodiments described herein can optionally include one or more of the following features. For example, the one or more shopper trust score groupings can correspond to one or more bag check frequency rates. The one or more bag check frequency rates can correspond to one or more percentages of retail environment visits by the shopper in which the bag check is to be randomly performed on the shopper. The randomization process can include adjusting a frequency at which the bag check is to be randomly performed on the shopper during subsequent retail environment visits. The bag check can be a manual process. The bag check can also be an automated process at a bag check station in the retail environment.

One or more embodiments described herein can include a method for determining whether to check a bag of a shopper based on a shopper trust score in a retail environment, the method including: receiving, by a computer system, shopper information including an identifier associated with a shopper, retrieving, by the computer system and from a data store, bag checkout history data associated with the shopper based on the identifier, the bag checkout history data including a shopper trust score, receiving, by the computer system, checkout confidence data during a checkout process of the shopper, the checkout confidence data indicating whether contents of a shopper's bag match transaction data on a receipt from the checkout process, determining, by the computer system, whether the checkout confidence data satisfies threshold distrust criteria, adjusting, by the computer system, the shopper trust score based on the determination of whether the checkout confidence data satisfies the threshold distrust criteria, determining, by the computer system, whether the adjusted trust score satisfies bag check criteria, and returning, by the computer system, bag check instructions based on a determination that the adjusted trust score satisfies bag check criteria.

In some implementations, the embodiments described herein can optionally include one or more of the following features. For example, the identifier associated with the shopper can be a credit card or a username for an account of the shopper that is associated with the retail environment. Adjusting, by the computer system, the shopper trust score can include determining an amount of increase of the shopper trust score based on (i) the contents of the shopper's bag matching the transaction data on the receipt and (ii) the bag checkout history data. Adjusting, by the computer system, the shopper trust score can include increasing the shopper trust score by the determined amount of increase. The amount of increase can be logarithmic. The amount of increase can be linear. The amount of increase can be exponential. The amount of increase of the shopper trust score can be less than an amount of decrease of the shopper trust score.

As another example, adjusting, by the computer system, the shopper trust score can include determining an amount of decrease of the shopper trust score based on (i) a quantity of the contents of the shopper's bag that do not match the transaction data on the receipt and (ii) the bag checkout history data, and adjusting, by the computer system, the shopper trust score can include decreasing the shopper trust score by the determined amount of decrease. The amount of decrease of the shopper trust score can be greater than an amount of increase of the shopper trust score.

In some implementations, returning, by the computer system, the bag check instructions can include generating output to be presented at a user device of the shopper, the output including an indication to route the shopper to a bag check station before exiting the retail environment. Returning, by the computer system, the bag check instructions can also include generating output to be presented at a user device of an employee in the retail environment, the output including an indication to check the shopper's bag before the shopper exits the retail environment. Returning, by the computer system, the bag check instructions can also include generating an indication on the receipt that instructs the shopper to go through a bag check station before exiting the retail environment.

As another example, the checkout process can be a self-checkout process. The checkout process can be a scan-and-go checkout process. The checkout process can be a manual checkout process with an employee of the retail environment. The checkout process can also be a vendor-based fulfillment process. In some implementations, the method can include objectively identifying, by the computer system and based on the received shopper information, the shopper.

As another example, the method can also include adjusting, by the computer system and based on the adjusted trust score, a frequency of bag checks, and determining, by the computer system, whether to perform a bag check based on the adjusted trust score and the adjusted frequency of bag checks. Adjusting, by the computer system, the frequency of bag checks can include decreasing the frequency of bag checks by a first amount based on a determination that the adjusted trust score is greater than a threshold trust score value. Adjusting, by the computer system, the frequency of bag checks can also include increasing the frequency of bag checks by a second amount based on a determination that the adjusted trust score is less than the threshold trust score value.

In some implementations, the threshold distrust criteria can include prior bag checks in the bag check history data that resulted in identifying a threshold quantity of items that did not match transaction data in receipts associated with the prior bag checks. The threshold distrust criteria can include (i) a shopping frequency in the bag check history data that is below a threshold frequency and (ii) an identified threshold quantity of items during prior bag checks in the bag check history data that do not match transaction data in receipts associated with the prior bag checks. The threshold distrust criteria can also include a shopping frequency in the bag check history data that is less than a threshold shopping frequency. The threshold distrust criteria can include a drive up orders frequency in the bag check history data that is less than a threshold drive up order frequency. The threshold distrust criteria can include an online orders frequency in the bag check history data that is less than a threshold online orders frequency. The threshold distrust criteria can include an order pickup frequency in the bag check history data that is less than a threshold order pickup frequency. The bag check criteria can be a trust score that is below a threshold trust score value. The shopper information can be received during the checkout process in the retail environment.

One or more embodiments described herein can include a system for determining whether to check a bag of a shopper based on a shopper trust score in a retail environment, the system including: a checkout station having at least a scanning device and a display, the checkout station being configured to perform a checkout process in a retail environment, a bag check station having at least a scanning device and being configured to be used to perform a bag check process after the checkout process, and a computer system that can be configured to (i) receive information from the checkout station and the bag check station and (ii) determine whether to perform a bag check on a shopper before the shopper exits the retail environment. The computer system can perform operations that include: receiving, from the checkout station, shopper information including an identifier associated with a shopper, retrieving, from a data store, bag checkout history data associated with the shopper based on the identifier, the bag checkout history data including a shopper trust score, determining a weighted probability score for the shopper based on the shopper trust score and one or more shopper trust score groupings, determining, using a randomization process, whether to perform a bag check on the shopper based on the weighted probability score, the weighted probability score indicating a probability that a randomly determined outcome from the randomization process identifies that the bag check is to be performed on the shopper, returning, to at least the bag check station, bag check instructions based on the determination that the bag check is to be performed on the shopper, receiving, from the bag check station, bag check data from performing the bag check on the shopper after the shopper completes the checkout process, the bag check data indicating whether contents of a shopper's bag match transaction data on a receipt of the shopper from the checkout process, adjusting the shopper trust score based on the bag check history data and the bag check data, and returning the adjusted shopper trust score for use in subsequent retail environment visits by the shopper.

In some implementations, the disclosed embodiments can include one or more of the abovementioned features. As another example, the bag check station can be located before an exit of the retail environment and after the checkout station.

The devices, system, and techniques described herein may provide one or more of the following advantages. For example, this technology provides for trust-based auditing of shoppers to improve accuracy in identifying and preventing shortages in the retail environment. Since this auditing is based on quantifiable trust scores, implicit bias in human review of suspicious (or non-suspicious) shopper behavior may not play a role in determining whether to audit shoppers before they exit the retail environment. Auditing decisions, using the disclosed technology, can be objectively made.

As another example, shoppers who have built up trust with the retail environment because they have not left the retail environment with unpaid items can be audited less frequently and sometimes more randomly. As a result, frequent shoppers can exit the retail environment quicker after a checkout process. The frequent shoppers can also maintain positive experiences with the retail environment that cause them to continue returning to the retail environment for future shopping trips.

The disclosed technology also provides for adjusting auditing frequency based on dynamically modifying shoppers' trust scores. Dynamically modifying trust scores based on prior bag checks can result in uniquely different auditing schemes for each shopper. The uniquely different schemes can provide objective targeting of certain shoppers to reduce or otherwise prevent future shortages in the retail environment.

Additionally, the disclosed technology provides streamlined exit procedures to improve shopper experiences and efficiently audit shoppers in the retail environment. When a shopper completes a checkout process, an indication can be printed on their receipt as to whether they have been selected for a bag check. If they are selected for the bag check, the indication can direct them to a bag check station before exiting the retail environment. If they are not selected for the bag check, their receipt may not include any indication and the shopper can simply exit the retail environment through an exit doorway. In some implementations, the shopper's receipt can include an indication that their bags are not going to be checked this time. The indication can direct the shopper towards the exit doorway of the retail environment instead of the bag check station. The indications presented on the receipts can provide for a level of transparency so that shoppers are aware when their bags will be checked. The shoppers may not be confronted as they are exiting from the retail environment, which can make for uncomfortable experiences and/or negative shopping experiences at the retail environment.

The details of one or more implementations are set forth in the accompanying drawings and the description below. Other features and advantages will be apparent from the description and drawings, and from the claims.

BRIEF DESCRIPTION OF THE DRAWINGS

FIGS. 2A-B is a flowchart of a process for adjusting a shopper's trust score and determining whether to perform a bag check before the shopper leaves a retail environment.

FIG. 3A is a table indicating bag check history for two example shoppers.

Like reference symbols in the various drawings indicate like elements.

DETAILED DESCRIPTION OF ILLUSTRATIVE EMBODIMENTS

This document generally relates to technology for trust-based auditing procedures in a retail environment. Each shopper in the retail environment can be assigned a trust score. The trust score can be dynamically adjusted based on activities attributed to the shopper during prior shopping trips/experiences at the retail environment. For example, the trust score can be increased or decreased based on results from prior audits, such as bag checks, that are performed at the retail environment. A frequency of subsequent audits can then be adjusted based on the shopper's trust score and random offsetting techniques, thereby making audits less frequent and/or less predictable as the shopper earns more trust with the retail environment. Although the disclosed technology is described in reference to performing bag checks, the disclosed technology can also be applied to performing one or more other types of audits of a shopper in the retail environment. The audits can include, but are not limited to, checking the shopper's bag(s), cart, and/or basket for items that satisfy auditing criteria. For example, an audit can be performed to check if the shopper's bag, cart, and/or basket includes items exceeding a threshold value but that do not appear on the shopper's receipt. As another example, an audit can be performed to check if the shopper's bag, cart, and/or basket includes items that are associated with shortages in the retail environment but that do not appear on the shopper's receipt. One or more other auditing criteria can be used in combination with the disclosed technology to audit the shopper before they leave the retail environment.

Figure 1A:
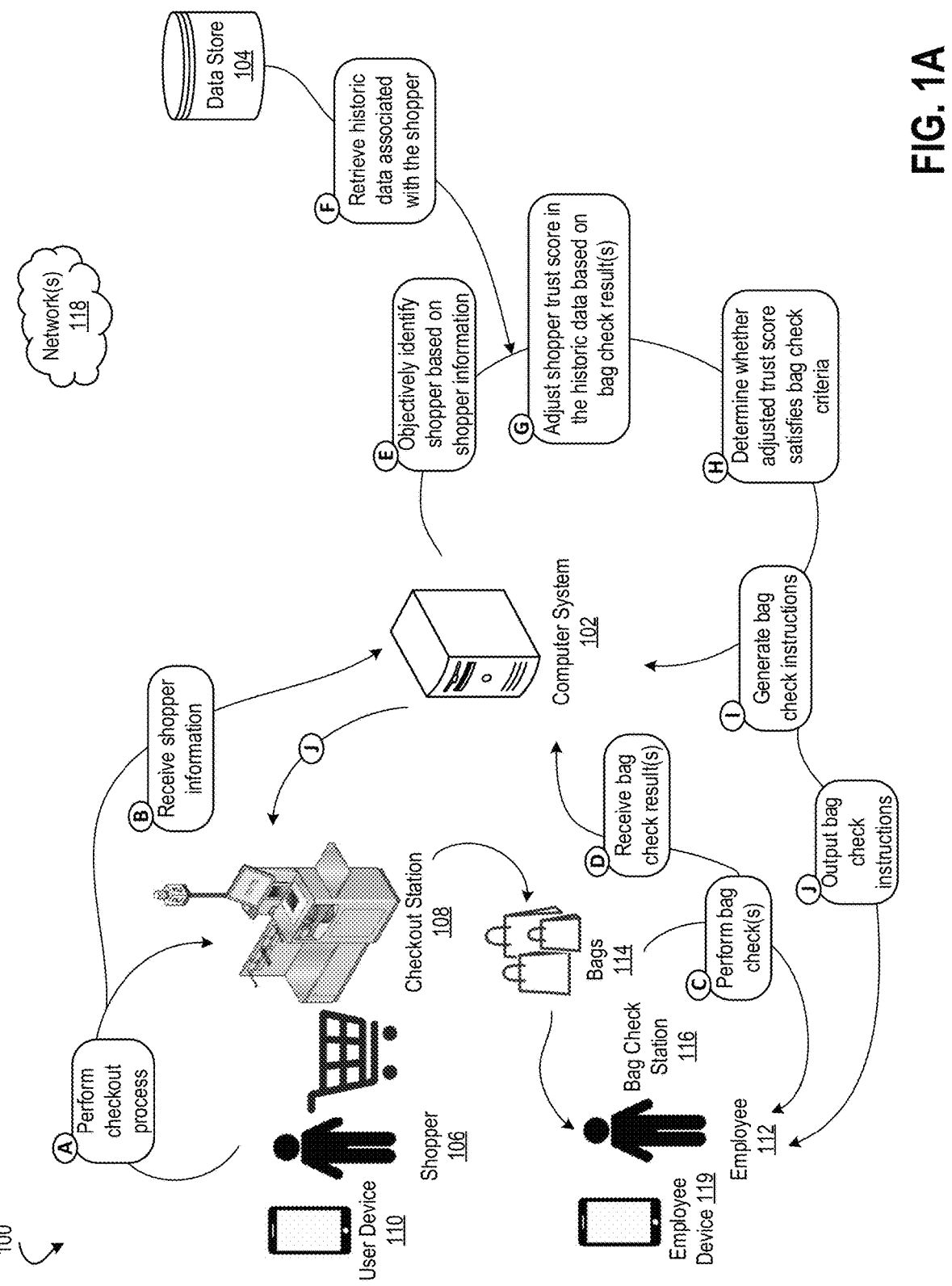
FIGS. 1A and 1B are conceptual diagrams for determining whether to perform a bag check after a checkout process in a retail environment.
Figure 1B:
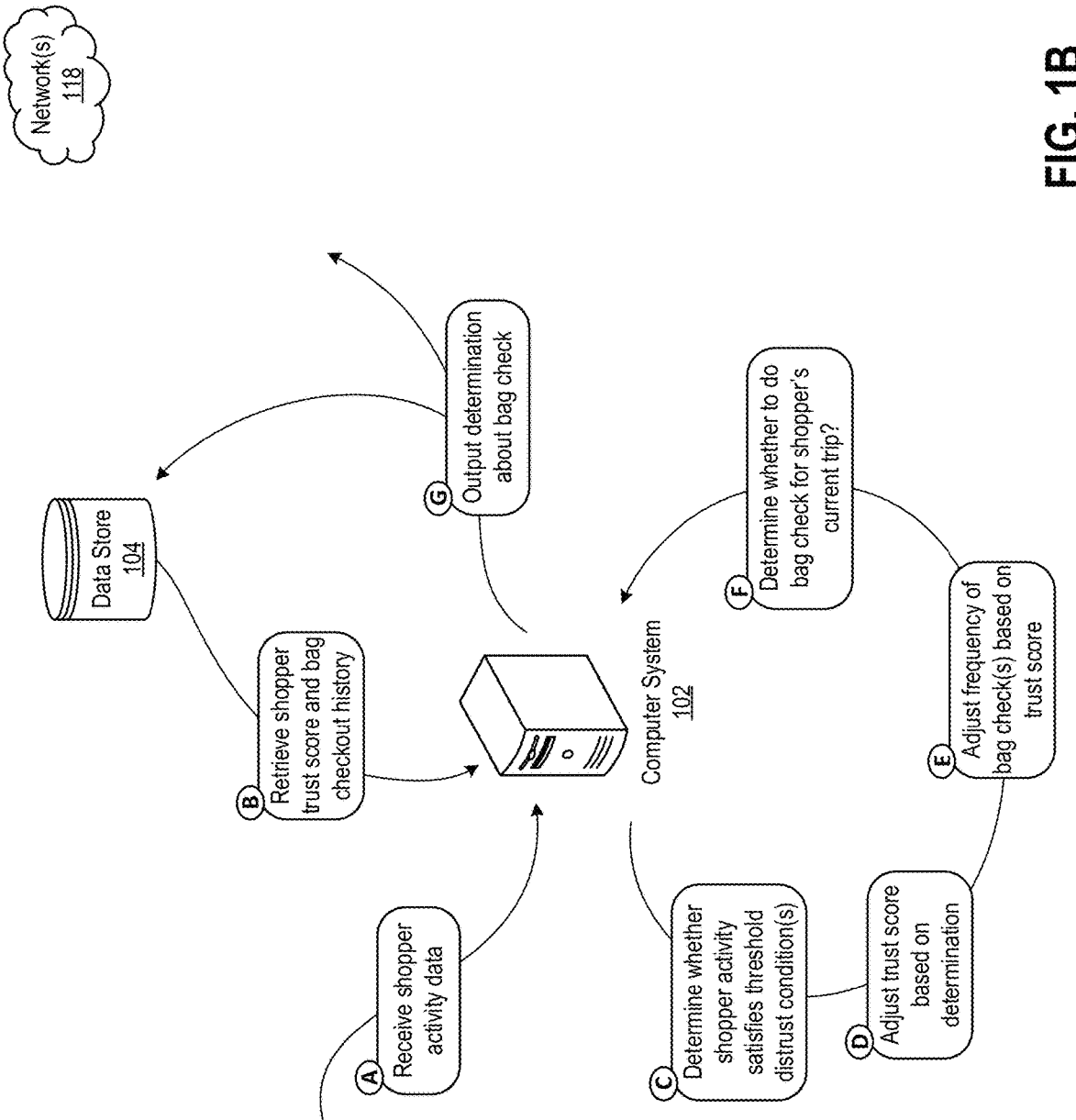

Referring to the figures, FIGS. 1A and 1B are conceptual diagrams for determining whether to perform a bag check after a checkout process in a retail environment 100. The technology described herein can be applied to a variety of arrangements or implementations in the retail environment 100. In some implementations, the disclosed technology can be applied to retail environments having known and/or big shortages (e.g., continuous shortages, shortages that exceed some threshold shortage criteria, etc.). For example, the disclosed technology can apply to implementations in which a shopper picks items off the shelves in the retail environment 100, scans the items as they are picked, and then exits the retail environment 100 without stopped through a checkout station, such as checkout station 108 in FIG. 1A. This implementation can be referred to as a scan and go process. As another example, the disclosed technology can apply to implementations in which a shopper performs a self-checkout process at the checkout station 108. The disclosed technology can also apply to implementations in the retail environment 100 in which a shopper checks out in a manual checkout lane having an employee. In some implementations, the disclosed technology may be applied to particular implementations in the retail environment 100. For example, the disclosed technology may only apply when shoppers use the scan and go process but not during manual checkout and/or self-checkout processes.

In FIG. 1A, a shopper 106 is performing a self-checkout process in the retail environment 100. The checkout station 108 can be in communication via network(s) 118 (e.g., wired and/or wireless) with a computer system 102, data store 104, user device 110, employee device 119, and/or components in a bag check station 116 (e.g., sensors, scanning devices, etc.).

In brief, the checkout station 108 can be a self-checkout lane including one or more scanning devices, input devices, output devices, and a display. The computer system 102 can be remote from the retail environment 100. The computer system 102 can also be in the retail environment. The computer system 102 can be any computing system, cloud-based service/system, and/or network of computers, devices, and/or systems. The computer system 102 can be configured to adjust trust scores of shoppers in the retail environment, adjust bag check frequencies based at least on the adjusted trust scores, and make determinations as to whether to subject shoppers to bag checks. The data store 104 can be any type of database and/or cloud-based storage configured to store objective information about shoppers in the retail environment 100. In some implementations, the data store 104 can be part of the computer system 102.

The user device 110 can be any type of mobile computing device, including but not limited to smartphones, mobile phones, cellphones, laptops, tablets, wearable devices (e.g., smart watches), etc. The shopper 106 can use the user device 110 to scan items as they are picked off the shelves in the retail environment 100. The shopper 106 can also access an account or profile associated with the retail environment 100 from their user device 110 to apply discounts, offers, and/or payment methods to a transaction during a checkout process at the checkout station 108.

The employee device 119 can be similar to the user device 110. The employee device 119 can be any type of mobile computing device described herein. In some implementations, the employee device 119 can include one or more sensors and/or scanning devices that can be used by an employee 112 to check and verify contents of a shopper's bags against contents indicated in the shopper's receipt. The employee device 119 can also present a mobile application that the employee 112 can use to provide input indicating results from bag checks that are performed by the employee 112.

Still referring to FIG. 1A, the shopper 106 can perform the checkout process in block A at the checkout station 108 by scanning their items and providing a form of payment thereto. Once the shopper 106 pays, shopper information can be transmitted to the computer system 102 (block B), from the checkout station 108. The shopper information can include credit card information or another unique, objective identifier that is associated with the shopper 106. The shopper information can be used, as described herein, to identify and retrieve a trust score associated with the shopper 106.

The shopper 106 can put their scanned items in bags 114. The checkout station 108 can print a receipt for the shopper 106 once they complete payment for their items. The receipt can indicate whether the shopper 106 is subject to a bag check. If the shopper 106 is subject to the bag check, the shopper 106 can bring their bags 114 to the bag check station 116 before exiting the retail environment 100. If the shopper 106 is not subject to the bag check, they can simply exit the retail environment 100.

The bag check station 116 can be separate from the checkout station 108. The bag check station 116 can be located near an exit of the retail environment, as described further in reference to FIG. 1C. The bag check station 116 can include one or more scanning devices and/or sensors that can be configured to check contents of the shopper 106's bags and compare the contents to the shopper 106's receipt. The bag check station 116 can also be manned by an employee 112, who can check the contents of the bag and determine whether the contents match the contents on the shopper 106's receipt. Accordingly, the employee 112 can perform a bag check in block C. The employee 112 can provide results from the bag check as input to their employee device 119. The bag check results can then be transmitted to and received by the computer system 102 in block D.

In some implementations, blocks B and D can be performed in one or more other orders. For example, block A can be performed, followed by block C. Blocks B and D can then be performed in order, at the same time, or in another order.

The computer system 102 can objectively identify the shopper 106 based on the received shopper information (block E). For example, the shopper information can include a username for an account that the shopper 106 has with the retail environment 100. The username can be an identifier used to objectively identify the shopper. As another example, the shopper information can include payment information, such as a credit card number that the shopper 106 provided during the checkout process (block A). The computer system 102 can link the credit card number to historic shopper data stored in the data store 104 to objectively identify the shopper 106. For example, the computer system 102 can use one or more machine learning models to associate the credit card number or other payment information with a shopper profile for a shopper who shopped at the retail environment 100 in the past and used the same credit card number or other payment information.

Once the shopper is objectively identified in block E, the computer system 102 can retrieve historic data associated with the shopper from the data store 104 in block F. The historic data can include a trust score associated with the shopper 106. The historic data can also include results from prior bag checks that were performed for the shopper 106.

In block G, the computer system 102 can adjust the shopper's trust score in the historic data based on the bag check results that were received in block D. In some implementations, as described above, the bag check results can be received at another time (e.g., after blocks E and/or F, before block G). As described further below, if the bag check results indicate that the contents of the bags 114 matched the shopper 106's receipt, then the trust score can be increased in block G. The trust score can be increased by an incremental amount. If the bag check results indicate that the contents of the bags 114 do not match the shopper 106's receipt, then the trust score can be decreased in block G. The trust score can be decreased by a greater amount than the trust score may be increased. The trust score can also be adjusted based on one or more factors, such as how often the shopper 106 shops at the retail environment 100 relative to how often their bag contents match their receipts. The one or more factors can also include whether a quantity of mismatched items in the bags 114 satisfies some threshold distrust criteria (e.g., if one item is found in the bags 114 that does not appear on the shopper 106's receipt, the shopper 106's trust score can be decreased less than if five items are found in the bags 114 that do not appear on the shopper 106's receipt).

The computer system 102 can then determine whether the adjusted trust score satisfies some bag check criteria in block H. For example, if the adjusted trust score is less than a threshold trust value, the bag check criteria can be satisfied and the shopper 106 may be subject to a bag check (during the current trip to the retail environment 100 or during a subsequent trip to the retail environment 100). If the adjusted trust score is greater than the threshold trust value, then the bag check criteria may not be satisfied and the shopper 106 may not be subject to a bag check. In some implementations, as described further below, block H can also include adjusting a frequency by which the shopper 106's bags are checked during subsequent visits to the retail environment 100.

In block I, the computer system 102 can generate bag check instructions. The bag check instructions can be outputted to the employee device 119 of the employee 112 and/or the checkout station 108 (block J). The employee device 119 can present the instructions to the employee 112 so that the employee 112 is aware that they will be checking the bags 114 of the shopper 106 in the bag check station 116. The checkout station 108 can be configured to print a receipt for the shopper 106 that includes an indication that the shopper 106's bags 114 are subject to a bag check. The indication can also include instructions that direct the shopper 106 to the bag check station 116 before exiting the retail environment 100. In some implementations, the bag check instructions can also be outputted to the user device 110. The user device 110 can present a notification (e.g., push notification, in-app message, text message, etc.) to the shopper 106 indicating that the shopper 106's bags 114 are subject to a check and that the shopper 106 should go to the bag check station 116 before exiting the retail environment 100.

Once the shopper 106's bags 114 are checked in response to block J, the computer system 102 can receive bag check results and update the trust score and/or frequency of subsequent bag checks associated with the shopper 106.

In some implementations, one or more blocks shown in FIG. 1A may not be performed during a current trip to the retail environment 100. For example, blocks A, B, and E-I can be performed. Then, based on a bag check performed after block J, the computer system 102 can update the shopper's trust score and/or frequency of bag checks for subsequent trips to the retail environment 100. Therefore, in some implementations, a bag check (blocks C-D) may not be performed during a current trip to the retail environment 100 but may be performed during one or more subsequent trips.

FIG. 1B similarly illustrates techniques for adjusting a shopper's trust score, adjusting a frequency of bag checks for the shopper based on their trust score, and determining whether to perform a bag check during a current trip for the shopper.

As shown in FIG. 1A, the computer system 102 can receive shopper activity data in block A. The shopper activity data can be received from a manual checkout station or a self-checkout station during or after a checkout process is performed. The shopper activity data can be the same as or similar to the shopper information described in FIG. 1A. The shopper activity data can also be received at a bag check station when a shopper checks the contents of their bags against their receipt and/or a retail employee checks the shopper's bag contents against the receipt. The shopper activity data can include bag check results, as described in FIG. 1A.

The computer system 102 can then retrieve a shopper trust score and bag checkout history from the data store 104 in block B. Refer to block F in FIG. 1A for additional discussion.

The computer system 102 can determine whether the shopper activity data satisfies one or more threshold distrust conditions (block C). The shopper activity data can satisfy the threshold distrust condition(s) if, for example, at least one item is found in the shopper's bags that does not match items on the shopper's receipt. As another example, the threshold distrust condition can be satisfied if a threshold quantity of items found in the shopper's bags do not match items on the shopper's receipt. One or more other threshold distrust conditions can be used, as described further below.

In block D, the computer system 102 can adjust the trust score based on the determination of block C. For example, if the threshold distrust condition(s) is satisfied, the trust score can be decreased. How much the trust score is decreased can also depend on a severity of the shopper activity data (e.g., how much the shopper activity data satisfies the threshold distrust condition(s)) and/or historic data associated with the shopper (e.g., how frequently the shopper shops at the retail environment, prior instances in which the shopper's bags content did not match their receipts, how often the shopper selects drive-up orders, online orders, and/or pick up orders versus shopping in store, how many items in the shopper's bags don't match items on the receipt, etc.). As another example, if the threshold distrust condition(s) is not satisfied, the trust score can be increased. How much the trust score is increased can also depend on the shopper activity data and/or historic data associated with the shopper, as described above.

The computer system 102 can also adjust a frequency of bag checks for the shopper based on the trust score in block E. For example, if the trust score exceeds a threshold trust value, the frequency of bag checks can be reduced by a predetermined amount. Random offsetting techniques can also be applied to make bag checks less frequent and/or less predictable. If the trust score is less than the threshold trust value, the frequency of bag checks can be increased by a predetermined amount. One or more other adjustments to the frequency of the bag checks can be made, as described further below.

In block F, the computer system 102 can determine whether to perform a bag check for the shopper's current trip. This determination can be made based on the shopper's trust score and the frequency of bag checks associated with the shopper. The shopper's trust score, for example, can be an indication of randomness for performing the bag check during the current trip. In this respect, a random number generator can be used. The computer system 102 can receive a value from the random number generator between 1 and 100 (or any other determined range of values). If the shopper has a trust score that exceeds some threshold trust value, then the returned value must be higher (e.g., closer to 100) or within a smaller threshold range of returned values (e.g., a value between 95 and 100) in order to determine that the shopper's bags should be checked during the current visit. On the other hand, if the shopper's trust score is below the threshold trust value, then the returned value must be within a bigger threshold range of returned values (e.g., a value between 50 and 100) in order to determine that the shopper's bags should be checked during the current visit. As a result, an element of randomness can be used to determine whether to check the shopper's bags. That element of randomness can be linked to the shopper's trust score.

The computer system 102 can output the determination about the bag check in block G. Refer to blocks I-J in FIG. 1A for additional discussion.

Figure 1C:
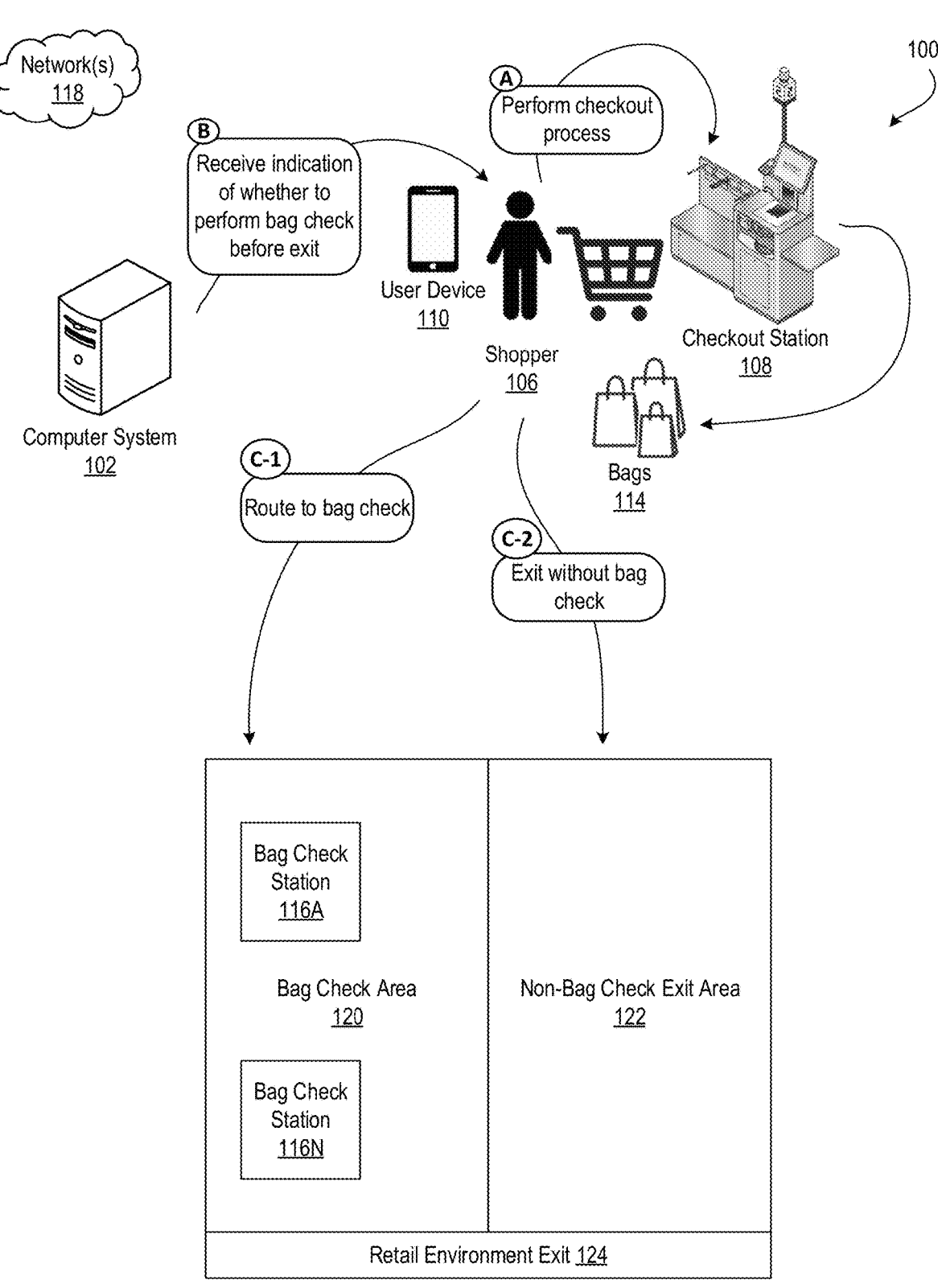
FIG. 1C is a conceptual diagram for determining whether to route a shopper to a bag check area after the checkout process and before exiting the retail environment.

FIG. 1C is a conceptual diagram for determining whether to route the shopper 106 to a bag check area 120 after the checkout process and before exiting the retail environment 100. As shown and described herein, the shopper 106 can perform a checkout process at the checkout station 108 (e.g., refer to FIG. 1A) (block A). The checkout process can be performed after the shopper 106 walks around the retail environment 100 and pulls the items they would like to purchase from shelves. During the checkout process, the shopper 106 can put their scanned items into the bags 114.

The checkout process can also be performed by a third party who may be tasked with shopping on behalf of another person. For example, the third party can receive a list of items to be purchased for the person. The third party can walk around the retail environment 100 and pull the items on the list from shelves. As the third party pulls the items, they can scan the items with their user device. Once the third party collects and scans all the items on the list, the third party can proceed to an audit station, such as the checkout station 108, to scan an identifier or other indicator presented at their user device. By scanning the identifier, the third party is acknowledging that they collected and scanned all the items on the list for which the person who ordered the items paid. The computer system 102 can receive the scanned identifier and use that to retrieve information about the third party, such as their trust score, to then determine whether to perform a bag check before the third party exits the retail environment 100.

During the checkout process (block A), the computer system 102 can determine whether a bag check should be performed on the bags 114 of the shopper 106 before they exit the retail environment 100. Refer to FIG. 1A for additional discussion. Once the computer system 102 makes this determination, the shopper 106 can receive, from the computer system 102, an indication of whether a bag check is to be performed before exiting in block B. The indication can be transmitted to the checkout station 108 and printed on a receipt once the shopper 108 completes the checkout process. The indication can also be transmitted to the user device 110 of the shopper 106. The indication can be presented as a notification, message, or text message on a display screen of the user device 110 and/or in a mobile application used while shopping at the retail environment 100.

Figure 2B:
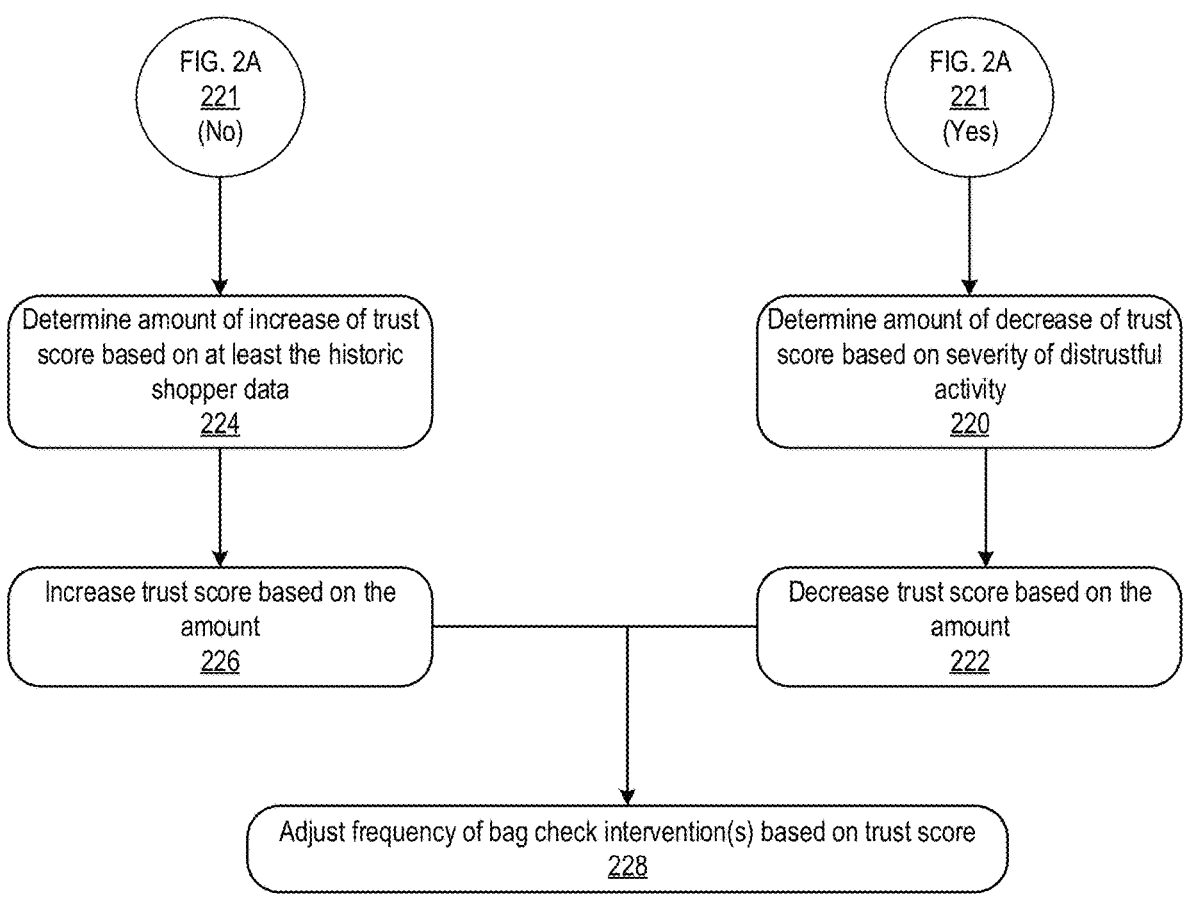

As described further in reference to the process 200 in FIGS. 2A-B, a number of bag checks performed during a given period of time (e.g., a day) can be limited, even if many shoppers have a bag check frequency indicating that they will be checked during that given period of time. For example, the number of bag checks in one day can be limited to 1 of every 50 shoppers who are likely to be subject to a bag check on that day (e.g., based on their trust score, based on their bag check frequency). 1 of every 50 of those shoppers can therefore receive an indication on their receipt indicating that they are flagged to undergo a bag check before exiting the retail environment 100.

In some implementations, the indication presented on the receipt can instruct the shopper 106 to exit through bag check area 120. The bag check area 120 can include the bag check stations 116A-N described in reference to FIG. 1A. In some implementations, the indication can merely be a symbol or other type of indicator. After the checkout station 108, an employee of the retail environment 100 can check shoppers' receipts and direct the shoppers towards the appropriate exit procedures based on reviewing the shoppers' receipts (and seeing the indication, for example). In some implementations, the receipts can include timestamps or other date information so that if a shopper has a receipt with a prior date, the employee can route the shopper to the bag check area 120, even if the receipt does not have the indication to perform the bag check. After all, the shopper might have taken items from the retail environment 100 on a current day but brought a receipt for a previous day so that the shopper could get away without paying for the items or undergoing a potential bag check.

Shoppers having receipts with the indication can be instructed to exit through the bag check area 120 whereas shoppers not having the indication can be instructed to exit the retail environment 100 normally through a non-bag check exit area 122. As another example, the shoppers can scan their receipts with a scanning device after the checkout station 108 to determine whether they can exit the retail environment 100 through the bag check area 120 or the non-bag check exit area 122. Over time, frequent shoppers may pass more often through the non-bag check exit area

122 than the bag check area 120 and new shoppers may pass more often through the bag check area 120 until they build enough confidence that the shopper's tally of items is accurate to become one of the frequent shoppers.

An indication on a shopper's receipt about performing a bag check can provide a discrete and transparent way to instruct the shopper 106 to undergo a bag check. This technique of notifying the shopper 106 about a bag check can be less invasive, alienating, and/or confrontational than an employee of the retail environment 100 approaching the shopper 106 before they exit and subjecting the shopper 106 to a bag check without their prior knowledge. Because the disclosed techniques are discrete and transparent, the shopper 106 may continue to feel comfortable shopping at the retail environment 100 and may have more ease/inclination to build the confidence that the shopper's tally of items is accurate over time.

Upon seeing the indication, the shopper 106 be either routed to the bag check area (block C-1) or exit the retail environment 100 without undergoing a bag check (block C-2). For example, the indication presented to the shopper 106 in block B can indicate that the shopper 106's bags 114 are subject to a bag check before exiting the retail environment 100. The shopper 106 can then proceed from the checkout station 108 to the bag check area 120 (block C-1). In the bag check area 120, an employee of the retail environment 100 can manually check the contents of the bags 114 against the shopper 106's receipt to see whether they match. The employee can then report results of the bag check using an employee device, as described in FIG. 1A. Once the bag check is complete, the shopper 106 can exit the retail environment through exit 124. In some implementations, the bag check area 120 can include bag checking stations in which the shopper 106 can scan their receipt using a scanning device (e.g., scan a barcode or other identifier on the receipt). In some implementations, the shopper 106 can scan a barcode or other identifier presented in a notification at their user device 110 to pull up the shopper 106's receipt. The contents of the bags 114 can then be automatically checked at the bag check station by using devices such as by cameras, image sensors, temperature sensors, weight sensors, and/or RFID readers. Such devices can capture information about the contents of the bags 114, which can then be processed by the computer system 102 (or a computing device at the bag check station) to determine whether the contents match the shopper 106's scanned receipt.

As another example, the indication presented to the shopper 106 in block B can have no bag check indication or an indication that the shopper 106 can exit the retail environment 100 without a bag check. The shopper 106 can then proceed from the checkout station 108 to a non-bag check exit area 122 and out through the exit 124 (block C-2). The non-bag check exit area 122 can be a normal pathway, hallway, or other type of area that leads to the exit 124 of the retail environment 100. Shoppers who do not undergo bag checks can simply walk out of the retail environment using the non-bag check exit area 122.

FIGS. 2A-B is a flowchart of a process 200 for adjusting a shopper's trust score and determining whether to perform a bag check before the shopper leaves a retail environment. A trust score can be assigned to a shopper. The trust score can be retrieved and updated for the shopper using an identifier (e.g., objective identifier) associated with the shopper. As described herein, the shopper can build trust slowly (e.g., increase confidence that the shopper's tally of items is accurate) and lose trust more quickly (e.g., decrease confidence that the shopper's tally of items is accurate) based on activity associated with the shopper as they shop at the retail environment. The trust score can then be used to determine whether to perform a bag check during a current visit to the retail environment and before the shopper exits or leaves the retail environment.

The process 200 can be performed by the computer system 102. The process 200 can also be performed by one or more other computing systems, devices, computers, networks, cloud-based systems, and/or cloud-based services. For illustrative purposes, the process 200 is described from the perspective of a computer system.

Referring to the process 200 in both FIGS. 2A-B, the computer system can receive shopper activity data with an objective identifier (block 202). The shopper activity data can include transaction data for a current shopping trip at the retail environment. The transaction data can include a list of items purchased during the shopping trip. The transaction data can also include payment information, such as a credit card number. In some implementations, the transaction data can include account information, such as a username, associated with a mobile application or other profile for the retail environment. The payment information and/or the account information can be used as the objective identifier. The shopper activity data can include bag check data, in some implementations. The bag check data can indicate whether contents of the shopper's bags matched the shopper's receipt during current or past shopping trip(s). Refer to FIGS. 1A-B for additional discussion.

In some implementations, the computer system can receive additional or alternative signals and/or system-based inferences from devices throughout the retail environment indicating shopper activity. These signals can be used to determine the shopper's trust score, increase the shopper's trust score, and/or decrease the shopper's trust score. For example, during a self-checkout process, a POS terminal can detect a missed scan by the shopper. The POS terminal can generate an indication indicating likelihood that the shopper did not scan one or more items during the self-checkout process. The indication can be transmitted to the computer system and used in combination with any of the other described data to determine and/or adjust the shopper's trust score. As another example, a self-checkout system can make a determination, from a combination of signals (e.g., image data, scans at the POS terminal, posture/movements of the shopper, location signals of the shopper throughout the retail environment, RFID readings of items the shopper wishes to purchase, etc.), that the shopper likely engaged (or is engaging) in ticket switching. This system-based determination (e.g., inference) can be transmitted to the computer system and used in combination with any of the other data described herein to determine and/or adjust the shopper's trust score.

The computer system can retrieve historic shopper data using the objective identifier in block 204. For example, the computer system can access a data store and search for historic shopper data that is linked to the objective identifier (e.g., the credit card number and/or the user account information, such as the username). The historic shopper data can include results from prior bag checks associated with the shopper. The historic shopper data can also include a trust score associated with the shopper. In some implementations, the historic shopper data can include a numeric value indicating a frequency at which the shopper's bags are to be checked during subsequent visits to the retail environment. Refer to FIGS. 1A-B for further discussion.

In block 206, the computer system can determine whether the shopper activity satisfies threshold distrust conditions.

The shopper activity assessed in block 206 can include the shopper activity data received in block 202. In some implementations, the shopper activity assessed in block 206 can additionally or alternatively include historic shopper activity data retrieved in block 204. The determination made in block 206 can be used to determine adjustments to the shopper's trust score. For example, if the shopper activity satisfies the threshold distrust conditions, then the shopper is less trustworthy and their trust score can be decreased. If, on the other hand, the shopper activity does not satisfy the threshold distrust conditions, then the shopper is more trustworthy and their trust score can be increased.

The computer system can determine whether the shopper activity satisfies the threshold distrust conditions in one or more ways. One or more of blocks 208-221 can also be combined to determine whether the shopper's activity satisfies the threshold distrust conditions.

For example, the computer system can determine whether prior bag checks resulted in identifying a threshold quantity of items that were not on the shopper's receipt (block 208). The more items that are found that do not match items on the shopper's receipt, the less trustworthy the shopper may be compared to someone whose bags, during prior checks, occasionally had 1 or 2 mismatched items (or no mismatched items). If the threshold quantity of items is identified in block 208, the computer system can determine that the shopper is distrustful and their trust score should be lowered by a significant amount of points. In some implementations, the computer system may also generate a notification/alert that reports the shopper as being distrustful. By reporting the shopper, the shopper's bags may be checked more frequently during subsequent trips to the retail environment. By reporting the shopper, the shopper may also lose one or more shopping privileges (e.g., the shopper may not be allowed to return to the retail environment in the future or for a predetermined amount of time). If the threshold quantity of items is not identified in block 208, then the shopper's trust score may still be decreased, but by a smaller amount than if the threshold quantity of items is identified. As an illustrative example, if the threshold quantity of items is 7 items and 3 items are found in the shopper's bag that do not match items on the shopper's receipt during a current trip, than the shopper's trust score can be decreased by a smaller quantity of points than if 7 or more items were found in the bag that do not match items on the shopper's receipt. Regardless of an amount that the shopper's trust score is decreased, whenever the trust score is decreased, the shopper becomes subject to more frequent bag checks than if the trust score is maintained at a certain value or increased over time. As mentioned above, block 208 can also be performed to determine whether a current bag check resulted in identifying a threshold quantity of items that do not match items on the shopper's receipt.

As another example of determining whether the shopper activity satisfies threshold distrust conditions, the computer system can determine whether shopper frequency is below a threshold frequency and that a threshold quantity of items not on the receipt was also identified (block 210). The threshold frequency can vary depending on the shopper or type of shopper. For example, a first threshold frequency can be used for customers or guests who shop for themselves. A second threshold frequency can be used for third parties who shop on behalf of customers (e.g., the third parties fulfill orders that are made online or through a mobile application accessible to the customers). The second threshold frequency can be higher than the first threshold frequency, especially in scenarios in which the third parties are shopping on behalf of customers every day or on a work schedule (e.g., a third party can shop for customers on Mondays, Wednesdays, and Fridays, from 7 AM-3 PM each of those days, which means the third party can perform many shopping trips per day). In some implementations, the first threshold frequency can be higher than the second threshold frequency.

The threshold quantity of items can be similar or the same as the threshold quantity of items described in reference to block 208.

Still referring to block 210, a more frequent shopper can build more trust with the retail environment (e.g., increased confidence that the shopper's tally of items is accurate), especially if prior bag checks associated with the shopper resulted in minimal or no identifications of mismatched items. If the shopper is an infrequent shopper at the retail environment, the shopper might not have had enough time to build a rapport with the retail environment to be considered trustworthy or trustworthy enough to reduce a frequency of subsequent bag checks. When this infrequency of shopping is coupled with the threshold quantity of mismatched items during prior bag checks or a current bag check, the shopper may be considered distrustful (or otherwise not trustworthy enough to lower the frequency of bag checks). As a result, the distrust condition(s) can be satisfied and the shopper's trust score can be decreased accordingly. On the other hand, and as an illustrative example, if a shopper has over 500 transactions with the retail environment and only 5 instances of mismatches between bagged items and receipts, the shopper's trust score may be reduced by a smaller amount than if the shopper had 150 transactions and 20 instances of mismatches between bagged items and receipts.

As another example of determining whether the shopper activity satisfies threshold distrust conditions, the computer system can determine whether shopping frequency of the shopper is below a threshold shopping frequency (block 212). Refer to block 210 for additional discussion about shopping frequency.

As another example of determining whether the shopper activity satisfies threshold distrust conditions, the computer system can determine whether a frequency of drive up orders is below a threshold drive up frequency (block 214). Drive up orders require the shopper to purchase items online or through a mobile application, pay for the items, and then arrive at the retail environment to pick up the purchased items. The shopper may not be required to go into the retail environment to pick up the purchased items. Moreover, the shopper may not be required to go into the retail environment and pick items off the shelves because the items will already be picked by employees of the retail environment once the shopper pays for the items online or through the mobile application. Drive up orders therefore make the shopper more trustworthy because these types of orders make it harder (or otherwise impossible) for the shopper to attempt taking items out of the retail environment that they did not pay for. The more drive up orders the shopper engages in, the more trustworthy they may be because the drive up orders provide evidence that the shopper intends to pay for whatever items they purchase from the retail environment. Therefore, if the shopper engages in drive up orders that is less than the threshold drive up frequency, the shopper may not be as trustworthy as another shopper whose drive up frequency is greater than the threshold drive up frequency. In fact, a shopper whose drive up frequency is greater than the threshold drive up frequency can be more trustworthy and their trust score can be increased accordingly.

As another example of determining whether the shopper activity satisfies threshold distrust conditions, the computer system can determine whether a frequency of online orders is below a threshold online order frequency (block 216). Like the drive up orders described in block 214, online orders require the shopper to purchase items online or through the mobile application, pay for the items, and then receive the items. The shopper can receive the items by going to the retail environment and picking up the items in an online orders location in the retail environment. The shopper can also receive the items in the mail. When the shopper goes to the retail environment to pick up the online order, the purchased items may already be collected and bagged by the employees of the retail environment. Therefore, the shopper is not required to pull the items off the shelves and instead can quickly pick up the bagged items and leave the retail environment. Like drive up orders, a high frequency of online orders can indicate that the shopper is trustworthy since online orders make it challenging (or otherwise impossible) to attempt taking items out of the retail environment without paying for them. Refer to block 210 for additional discussion about satisfying the threshold online order frequency.

As another example of determining whether the shopper activity satisfies threshold distrust conditions, the computer system can determine whether a frequency of order pickup is below a threshold pickup frequency (block 218). The order pickup is similar or the same as drive up orders and/or online orders. Refer to blocks 214 and 216 for additional discussion. As shown by blocks 214-221, the shopper's trust score can be affected by how frequently the shopper engages in activities that build trust. The more often the shopper engages in drive up, online, or pickup orders, the more trustworthy the shopper is (after all, these types of orders reduce or otherwise prevent the shopper from having inaccurate tallies of items in subsequent trips to the store or retail environment). The less often the shopper engages in drive up, online, or pickup orders, the less trustworthy the shopper may be (especially in combination with one or more of the blocks 208-212).

As yet another example, determining whether the shopper activity satisfies threshold distrust conditions can include determining whether a confidence that the activity satisfies the distrust condition(s) exceeds a threshold confidence value (block 219). The computer system can generate a confidence value (e.g., probability metric) indicating likelihood that the shopper is engaging in distrustful or risky activity. As an illustrative example, the computer system can receive image data, transaction data, and/or system-based inferences from a POS terminal at a self-checkout system indicating a potential missed scan. The computer system can analyze the received data (e.g., by applying a model trained with machine learning techniques to analyze activity in the received data indicative of risky or distrustful activity) from the self-checkout system to determine whether the received data indicates the shopper is engaging in risky activity, such as ticket switching or leaving the retail environment with items the shopper did not pay for. The computer system can generate the confidence value based on analysis of the activity indicated by the received data. As another illustrative example, the computer system can receive shopper activity data associated with the shopper (e.g., historic, real-time, and/or near real-time data), such as results from prior bag checks (e.g., identifying items that the shopper did not pay for in at least a threshold amount of prior bag checks), a quantity of prior bag checks performed on the shopper (e.g., the shopper underwent a quantity of bag checks exceeding a threshold quantity of bag checks for a typical shopper at the retail environment), and/or other high confidence system-based inferences described herein (e.g., a self-checkout system determines a likelihood that the shopper is engaging in ticket switching and/or is not paying for all the items they wish to purchase). The computer system can generate the confidence value based on determining whether the shopper activity data indicates that the shopper is engaging in distrustful or risky activity (or has a tendency to engage in distrustful or risky activity). If high confidence is established (e.g., the confidence value exceeds the threshold confidence value), then the shopper activity satisfies threshold distrustful conditions, and the shopper's trust score can be decreased (which can cause the shopper to undergo additional bag audits).

As another example, determining whether the shopper activity satisfies threshold distrust conditions can include determining whether an item value associated with the activity exceeds a threshold value (block 221). The item value can be an actual ticket price of the item. The item value can also be a potential loss to the retail environment if the item is not identified/paid for before the shopper leaves the store with the item. As an illustrative example, the computer system can receive data from prior bag checks performed on the shopper. The prior bag check data can indicate items that may have been identified for which the shopper did not pay. The value of those identified items can be aggregated and used by the computer system to determine whether the shopper has engaged in activity in the past that cost the retail environment potential losses exceeding the threshold value. An another illustrative example, if the self-checkout system determines in real-time or near real-time that the shopper likely ticket-switched, the computer system can determine whether the actual price of the item whose barcode was switched for a less expensive item exceeds the threshold value. If the threshold value is exceeded, then the shopper activity can satisfy the threshold distrust conditions.

In some implementations, the computer system can determine whether the confidence of block 219 and the item value of block 221 satisfy threshold risk criteria (and/or a threshold aggregate risk value) to determine whether the shopper activity satisfies the threshold distrust conditions.

If the shopper activity satisfies one or more of the threshold distrust condition(s) (blocks 206-221), the computer system can determine an amount of decrease of the shopper's trust score based on a severity of the distrustful activity (block 220). The more severe the activity, the more the trust score is decreased. The less severe the activity, the less the trust score is decreased. The computer system can then decrease the trust score based on the determined amount in block 222.

As an illustrative example, a shopper can have a neutral trust score of 50 out of 100. The shopper's bags can be audited on their first trip to the store and 5 items that each exceed a threshold price value can be found in the bags that do not match items on the receipt. Because multiple expensive items were found in the shopper's bag that do not match the receipt, the shopper may be engaging in more severe distrustful activity. Accordingly, the shopper's trust score can be decreased to 25 out of 100. As another illustrative example, another shopper can also start with a neutral trust score of 50 out of 100. This shopper's bags can be audited on their first trip to the store and 5 packs of gum can be found in the bags that do not appear on the receipt. Although multiple items were found, the items can be less than the threshold price value (individually or in aggregate). This shopper may still be performing distrustful activity, but the activity can be less severe. Therefore, the shopper's trust score can be decreased to 40 out of 100, as an example.

The computer system can also adjust a frequency of bag check interventions based on the trust score in block 228. As described further below, when the shopper's trust score decreases, frequency of subsequent bag checks (e.g., audits) can increase. So long as the shopper is not earning trust with the retail environment, their bags may be checked more frequently.

If the shopper activity does not satisfy one or more of the threshold distrust condition(s) (blocks 206-221), the computer system can determine an amount of increase of the trust score based on at least the historic shopper data (block 224). The computer system can increase the trust score based on the determined amount in block 226. The trust score can be incrementally increased over time as the shopper builds more trust with the retail environment. In other words, so long as the shopper engages in trustful activity (e.g., during bag checks, items in the bags match the items on the shopper's receipt), the trust score can continue to incrementally and/or slowly increase. As described throughout this disclosure, the shopper's trust score can increase slowly but decrease quickly based on the shopper's activities.

The shopper's trust score can be increased using one or more techniques. The trust score can be linearly increased so that the shopper's trust score is increased at a constant rate every time that the user engages in trustful activity (or does not satisfy the threshold distrust condition(s)). As an illustrative example, every time the shopper's bags are audited, the items in the bags may match the shopper's receipt. After each of these audits, the shopper's trust score can be increased by two points (e.g., the shopper starts at a score of 50 and the score increases to 52, 54, 567, 58, 60, etc.).

In some implementations, the trust score can be increased at an exponential rate. For example, every time the shopper's bags are audited, the items in the bags may match the shopper's receipt. After each of these audits, the shopper's trust score can be increased by a factor of 2. As another example, the shopper's trust score can start at 50 and increase to 52, 54, 58, 66, etc.

In yet some implementations, the trust score can be increased logarithmically in which the trust score may increase more quickly in the beginning when the shopper engages in trustful activity and then increase more slowly and eventually plateau as time goes on and the shopper continues to engage in trustful activity. For example, the shopper can start with a trust score of 50. After a first audit in which the shopper's bag items match the receipt, the score can be increased to 70. After every subsequent audit in which the items match the receipt, the score can be increased by two points and then eventually one point. One or more other techniques may also be used to increase the shopper's trust score.

The computer system can also adjust the frequency of bag check intervention(s) based on the trust score in block 228. At first, each shopper can be audited, or have their bags checked, by a same frequency. Over time, frequency of subsequent bag checks can become lower and more random if the shopper is associated with trustful activity. In other words, the shopper is building trust with the retail environment over time and since they can be trusted, the computer system can incrementally back off the frequency of auditing that shopper's bags. If the shopper is associated with distrustful activity, the frequency of subsequent bag checks can become higher over time. Moreover, a random offset can be used so that it may be less predictable when a shopper will be audited. For example, the computer system can determine that 25% of shoppers will be audited on their second shopping trip, 50% of shoppers will be audited on their third shopping trip, and 25% of shoppers will be audited on their fourth shopping trip. The random offset can vary. The random offset can be based on a bell curve or other curve shape.

As an illustrative example, each shopper can start with bag checks on their $1^{st}$, $3^{rd}$, and $7^{th}$ shopping trips in the retail environment. If a shopper's bags are checked each of those times and all the items in the bags match their receipt (and/or they perform more online, drive up, or pick up orders), their trust score increases, and the frequency of bag checks can be reduced accordingly. As a result, now the shopper can be audited on their $15^{th}$, $25^{th}$, $39^{th}$, and then $50^{th}$ shopping trips. If the shopper's trust score continues to increase during these audits, the frequency of audits may continue to be incrementally reduced such that the shopper is audited every 50 trips (or some other incremental reduction in frequency so that the shopper is audited less often) to the retail environment with a random offset to make the audits less predictable. For example, although the shopper may be slotted for a check on their $39^{th}$ trip, the computer system may apply a random offset that pushes the $39^{th}$ trip audit to a $41^{st}$ trip audit. Although the shopper may have built a lot of trust with the retail environment (e.g., the shopper has a highest trust score or a trust score that exceeds a high threshold value), bag checks will still be triggered periodically and somewhat randomly for that user.

As another illustrative example, a shopper can start with audits on their $1^{st}$, $3^{rd}$ and $7^{th}$ shopping trips, like the other shoppers in the retail environment. During at least one of those audits, the shopper's bags may not include all of the items on the shopper's receipt (e.g., the bags contain items that are not on the receipt). Because of this distrustful activity, the shopper's trust score can decrease and the frequency of this shopper's audits can increase so that they are audited more often (e.g., they can be audited on their $11^{th}$, $15^{th}$, and $17^{th}$ shopping trips and this frequency can increase if the shopper continues to engage in distrustful activity or decrease if the shopper engages in trustful activity). Sometimes, if the shopper continues to engage in distrustful activity, their trust score can decrease so much that the shopper returns to the initial auditing frequency that every new shopper is subject to. For example, on the $17^{th}$ shopping trip, the shopper's bags can be checked and items can be found that do not match the shopper's receipt. The shopper's trust score can be decreased yet again, which can cause the shopper's auditing frequency to be reset to audits every $1^{st}$ $3^{rd}$, $7^{th}$ etc. shopping trip.

Auditing frequency determined by the computer system can vary. In some examples, the initial auditing frequency can be every $2^{nd}$, $4^{th}$, $8^{th}$, $10^{th}$, $15^{th}$, $19^{th}$, $25^{th}$, etc. shopping trip to the retail environment. As another example, the initial auditing frequency can be every $1^{st}$ $2^{nd}$, $3^{rd}$, $7^{th}$, $11^{th}$, $13^{th}$, etc. shopping trip to the retail environment. In some implementations, the initial auditing frequency can be every $1^{st}$, $5^{th}$, $10^{th}$, $17^{th}$, $25^{th}$, etc. shopping trip. One or more other initial auditing frequencies can be used and determined by the computer system. For example, the initial auditing frequency can include more initial audits in geographic locations that have higher rates of inaccurate item tallies for shoppers compared to geographic locations having lower rates of inaccurate item tallies for shoppers.

In some implementations, if the shopper is a professional shopper, such as someone hired to shop on behalf of another user or customer, the shopper can be put on probation from shopping in the retail environment based on their trust score and/or auditing frequency. For example, the professional shopper can be held to a different threshold trust level than other shoppers in the retail environment, such as customers shopping for themselves and their families/friends. If the professional shopper's trust score is less than the threshold trust level for professional shoppers, then one or more actions can be taken against the professional shopper. Such actions can include, but are not limited to, limiting how many shopping trips the professional shopper is hired for and/or putting the professional shopper on probation in that they cannot shop in the retail environment for a predetermined amount of time (which can be based on how low the professional shopper's trust score is).

In some implementations, the computer system can also generate one or more actions to be taken against any shopper based on their trust score and/or auditing frequency. For example, if the shopper's trust score is less than a general threshold trust level, the shopper can be limited in their shopping flexibility options for a predetermined period of time. Limiting the shopping flexibility options of the shopper can include limiting the shopper's ability to shop with a scan-and-go process, requiring the shopper to purchase items beforehand and pick up the items in the retail environment, and/or requiring an employee of the retail environment to oversee/review the shopper's self-checkout process at a self-checkout system (if, for example, the shopper provides payment information at the self-checkout system that matches payment information for a shopper who is associated with a low trust score). One or more other shopping options can be limited based on the shopper's trust score being less than the general threshold trust level.

Instead of determining frequency of auditing based on risk associated with the shopper, the frequency of auditing is based on the shopper's actions during their bag checks. Doing so may cause less friction and build trust since a first time that the shopper shops at the retail environment and/or is audited. Adjusting frequency of bag checks based on trust score and some element of a random offset can help the shoppers feel comfortable shopping at the retail environment rather than feeling under scrutiny or guilty for actions they have not performed. Moreover, the retail environment has a level of transparency with the shoppers so that the shoppers know their bags will be audited at some point. Therefore, the techniques described herein can be beneficial to ensure the shoppers have positive shopping experiences at the retail environment and engage in trustful activity.

FIG. 3A is a table 300 indicating bag check history for two example shoppers, A and B. In this example, shopper A is a more trustful shopper than shopper B. As shown in the table 300, each shopper A and B are audited the first time they shop at a retail environment. During the first bag check (e.g., audit), items in each of the shopper A and B's bags matched their respective receipts. As a result, both shoppers A and B are assigned a baseline trust score of 50 out of 100.

For now, shoppers A and B can be audited at a same frequency (e.g., because they have the same trust score, because they both passed the first audit). Therefore, they both can be audited again during their third shopping trips. During each of their third shopping trips, the shoppers bagged items matched their receipts. As a result, the trust scores of the shoppers A and B were increased by a same amount of points. Each shopper A and B now has a trust score of 53. As described in reference to the process 200 in FIGS. 2A-B, the trust scores can be incrementally increased. At first, a trust score can be increased by few points and over time as the shopper builds more trust, their score can be increased by more points. As another example, the shopper's trust score can be increased by more points at first and increased by fewer points over time as the shopper continues to build trust with the retail environment.

The shoppers A and B may still be audited at the same frequency after the third bag checks. Both the shoppers A and B can next be audited during their seventh shopping trips to the retail environment. During the seventh shopping trip, shopper A's bags contain items that match their receipt. Shopper A continues to build trust with the retail environment and thus their trust score increases to 60. Because shopper A's trust score has increased, the frequency of their bag checks can be lowered. For example, shopper A may not undergo a bag check again until their twenty-first shopping trip to the retail environment. The bag check frequency can be adjusted accordingly using any of the techniques described herein.

Shopper B's bags, on the other hand, contain at least one item that does not match their receipt. Shopper B has lost some trust with the retail environment, and thus their trust score is decreased to 40. As described herein, the score can decrease quicker than the score increases. Although shopper B passed the prior two audits, once instance of item mismatch caused shopper B's trust score to decrease by 7 points. Because shopper B's trust score decreased, shopper B's frequency of bag checks can remain the same or increase. As shown in the table 300, shopper B can be subject to bag checks on their fifteenth, seventeenth, and twenty-first trips to the retail environment.

As mentioned above, shopper A's trust score can satisfy a threshold score value after the seventh bag check so that the shopper A is not subject to a bag check on their fifteenth shopping trip. Shopper B, on the other hand, is subject to a bag check on their fifteenth shopping trip because their trust score decreased after the seventh shopping trip bag check. During the fifteenth bag check, the shopper B's bags can match their receipt, so the trust score can be incrementally increased. Here, the trust score can be increased by fewer points than after the first bag check. This is because the shopper B has performed distrustful activity in the past and therefore has not build up enough trust with the retail environment to warrant a greater increase in the trust score. Shopper B's trust score has been increased to 42 out of 100. The shopper B may still be subject to frequent bag checks.

On shopper B's seventeenth shopping trip, their bags can be checked. During that check, the items in their bags can match the items on their receipt. As a result, the shopper B's trust score can be increased. This time, the trust score can be increased by more points than after the fifteenth bag check because the shopper B is slowly building more trust with the retail environment over time. Now, the shopper B's trust score is increased to 49 out of 100. Although shopper B's trust score is increasing, shopper B is still subject to frequent bag checks until shopper B builds more trust with the retail environment (e.g., their trust score satisfies threshold trust condition(s) such as the trust score exceeding some threshold score value, a quantity of bag checks being performed in which the items match the receipts, a quantity of drive up/online/pick up orders being performed in lieu of shopping in person, etc.). As a result, shopper B can be audited again during their twenty-first shopping trip to the retail environment.

As mentioned above, shopper A is audited during their seventh shopping trip and then audited again during their twenty-first shopping trip. Shopper A may not be audited again between those trips because their trust score can satisfy some threshold score value. In other words, shopper A may not be audited between those trips because they have built enough trust with the retail environment to lower the frequency of bag checks over subsequent shopping trips. During the twenty-first shopping trip, shopper A's bags match their receipt. Therefore, shopper A's trust score can be incrementally increased again to 67 out of 100. The frequency of bag checks for shopper A may also be lowered. As an illustrative example, shopper A may not be audited again until their thirty-first shopping trip.

During shopper B's twenty-first shopping trip, their bags are checked. The contents of the bags match shopper B's receipt, so shopper B is building their trust with the retail environment. As a result, shopper B's trust score can be increased from 49 to 54 out of 100. As shown over the course of the prior three bag checks, shopper B's trust score is increased by more points each time that they gain trust. Shopper B's trust score can continue to gain more points each time that their bags match their receipts during subsequent shopping trips. Moreover, as their trust score increases, the frequency of auditing can be lowered. For example, shopper B may be audited again during their thirtieth shopping trip. The frequency of auditing can also be adjusted using one or more of the techniques described herein.

Figure 3B:
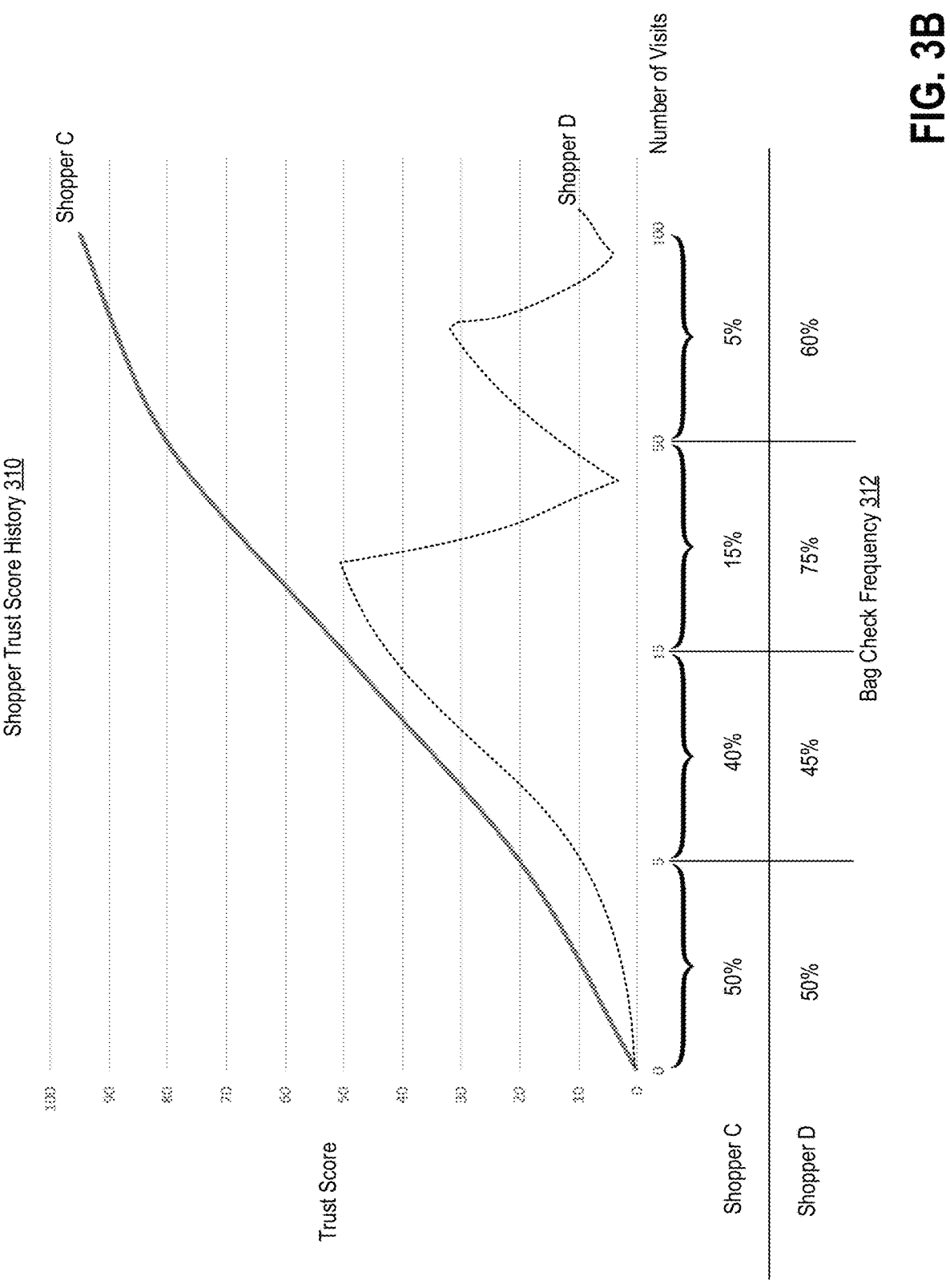
FIG. 3B is a graph illustrating trust score history for two example shoppers.

FIG. 3B is a graph 310 illustrating trust score history for two example shoppers, C and D. The graph 310 demonstrates changes in trust scores of shoppers C and D over time. An x-axis of the graph 310 represents a number of visits to a retail environment and a y-axis of the graph 310 represent the trust scores of the shoppers C and D over the course of visiting the retail environment. The graph 310 is also accompanied by a bag check frequency table 312. The table 312 indicates a frequency of bag checks per shopper over time, which is based at least in part on the respective shopper's trust score.

In the example of FIG. 3B, the trust scores can be a value on a scale of 0 to 100, where 0 is most distrustful and 100 is most trustful. One or more other scales can be used for the trust scores, such as 0 to 5, 1 to 50, 0 to 50, 1 to 50, etc. Here, both shoppers C and D start with a trust score of 0 since they have not yet visited the retail environment. In some implementations, the shoppers trust scores can start at a different value, such as a neutral value. A neutral value can be a value indicating that the associated shopper is neither trustworthy nor distrustful. As an illustrative example, the neutral value can be 50, where the trust score scale is 0 to 100.

The shopper C and D's trust scores can increase over time as the shoppers continue to shop at the retail environment and engage in trustful activity. For approximately the first five visits to the retail environment, both shoppers C and D have a bag check frequency of 50%. Therefore, approximately 50% of their first five visits involve a bag check for each of the shoppers C and D. During those bag checks, the contents of shopper C's bags match shopper C's receipts. Therefore, shopper C's trust score gradually increases over the first five visits to the retail environment.

On the other hand, shopper D's trust score increases more slowly during the first five visits, which can be attributed to the fact that during at least one of the bag checks performed during the first five visits results in identification of some mistrustful activity. As an illustrative example, during a bag check on shopper D's second trip to the retail environment, a low cost item, such as a notebook, was found in the shopper D's bag that did not match any items on shopper D's receipt. Shopper D did not pay for the notebook, but because the notebook is a low cost item, shopper D's trust score may not be as greatly impacted as if they had stolen a more expensive item, such as a coffee machine or an electronic device.

Since shopper D might have engaged in some distrustful activity during the first five visits to the retail environment, shopper D's bag check frequency has decreased by a smaller amount than shopper C's bag check frequency (after all, shopper C has not engaged in any distrustful activity during the first five visits to the retail environment). In some implementations, shopper D's bag check frequency may increase rather than decrease. In some implementations, shopper C's bag check frequency may remain the same until shopper C builds more trust with the retail environment. Similarly, in some implementations, shopper D's bag check frequency may remain the same until shopper D builds more trust or engages in more distrustful activity. Shopper C now has a bag check frequency of 40% over the next ten visits to the retail environment (between visits 5 and 15). Shopper D now has a bag check frequency of 45% over the next ten visits to the retail environment since Shopper D is considered less trustworthy than shopper C at this time.

Between visits 5 and 15, shopper C continues to engage in trustful activity. Thus, shopper C's trust score continues to gradually increase. As a result, shopper C's bag check frequency during their next thirty-five visits (between visits 15 and 50) lowers to 15%. Thus, during shopper C's next thirty-five visits, their bags will only be checked 15% of the time.

Between visits 15 and 50, shopper C continues to engage in trustful activity. Shopper C's trust score continues to gradually increase. Eventually, as described in some implementations, shopper C's trust score can plateau. Here, shopper C's bag check frequency during the next fifty visits (between 50 and 100) lowers to 5%. During shopper D's next fifty visits, their bags will only be checked 5% of the time since shopper C is considered a trustworthy shopper at the retail environment. If shopper C continues to be trustworthy, then both their trust score and bag check frequency can plateau. For example, shopper C's bag check frequency can remain at 5% for remaining visits to the retail environment until shopper C is identified as engaging in distrustful activity. As described herein, some element of randomness (e.g., random offsetting) can be used to ensure that that the 5% of bag checks is unpredictable.

Returning to shopper D in the graph 310, between the visits 5 and 15, shopper D may continue to engage in distrustful activity. For example, during bag checks, more expensive items or greater quantities of items can be found in shopper D's bags that do not match items on their receipts. As a result, shopper D's trust score can decrease sharply from a score of 50 after their fifteenth visit to the retail environment (or after whichever visit to the retail environment resulted in distrustful activity being identified). Shopper D's trust score can continue to decrease to a score of 5 as shopper D is associated with more distrustful activity between their fifteenth and fiftieth visit to the retail environment. Also between visits 15 and 50, shopper D's bag check frequency has increased from 45% to 75%. This means that 75% of shopper D's next thirty-five visits will include bag checks.

Between the visits 50 and 100, shopper D continues to undergo more bag checks than shopper C. Shopper D's trust score gradually increases over these fifty visits as shopper D is associated with more trustworthy activities. For example, shopper D may engage in more drive up orders than in-store shopping. As another example, shopper D may still be engaging in distrustful activity, but it can be less severe than the activity they engaged in between visits 5 and 50. This can result in a slow increase in shopper D's trust score. Because shopper D has earned more trust between visits 15 and 50, their bag check frequency can lower from 75% to 60% for the next fifty visits to the retail environment. Therefore, between visits 50 and 100, shopper D's bags can be checked 60% of the time. This bag check frequency can remain until shopper D is associated with more trustworthy activity and/or engages in less severe distrustful activity. However, in the example of FIG. 3B, shopper D engages in more distrustful activity around visit sixty, which causes shopper D's trust score to decrease from approximately 32 to approximately by their one-hundredth visit. Although not shown in the table 312, shopper D's bag check frequency may also increase for visits after their one-hundredth visit.

Figure 4:
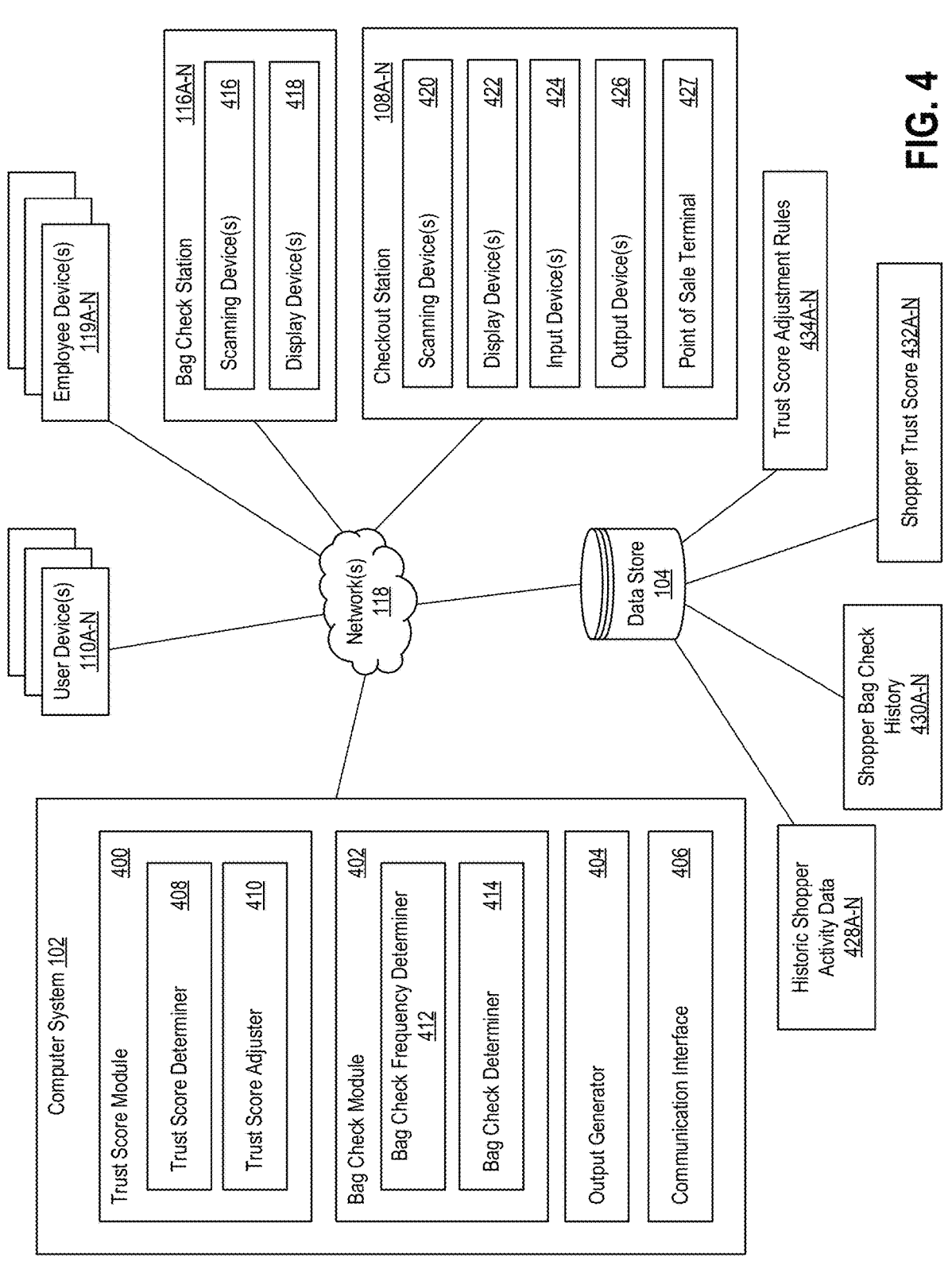
FIG. 4 is a system diagram of one or more components that can perform the techniques described herein.

FIG. 4 is a system diagram of one or more components that can perform the techniques described herein. As shown and described herein, the computer system 102, data store 104, checkout stations 108A-N, user devices 110A-N, bag check stations 116A-N, and employee devices 119A-N can communicate (e.g., wired and/or wirelessly) via the network(s) 118.

The computer system 102 can be configured to determine and adjust trust scores and bag check frequency for shoppers in a retail environment. The computer system 102 can include a trust scores module 400, a bag check module 402, an output generator 404, and a communication interface 406. The trust score module 400 can be configured to determine and adjust trust scores of shoppers based on activity attributed to the shoppers. The trust score module 400 can include a trust score determiner 408 and a trust score adjuster 410. The trust score determiner 408 can be configured to determine a trust score of a shopper. For example, the determiner 408 can determine a first trust score for the shopper based on their first visit to the retail environment. The determiner 408 can retrieve historic shopper activity data 428A-N from the data store 104 to determine the shopper's trust score and/or adjustments to the shopper's trust score. A shopper, for example, whose historic shopper activity data 428A-N includes more trustful activity (e.g., frequent drive up orders, online orders, pick up orders, etc.) can be assigned a higher first trust score than another shopper whose historic data includes less trustful activity (e.g., prior suspicious activity). In some implementations, the determiner 408 can also retrieve shopper bag check history data 430A-N from the data store 104 to be used in determine the shopper's trust score and/or adjustments to the shopper's trust score. The trust score determined by the trust score determiner 408 can be saved and stored in the data store 104 as one of shopper trust scores 432A-N.

The historic shopper activity data 428A-N, shopper bag check history data 430A-N, and shopper trust scores 432A-N can be linked or otherwise associated with each other using objective identifiers that correspond to different shoppers in the retail environment. The objective identifiers can include user account information, such as usernames, for shoppers of the retail environment. The user account information can be used by the shopper to access a mobile application presented at the user devices 110A-N, search for items to purchase in the retail environment, place online, pickup, or delivery orders, scan items for purchase while in the retail environment, and pay for items purchased in the retail environment. The objective identifiers can also include payment information, such as credit card numbers, associated with the shoppers who purchase items in the retail environment. One or more other unique identifiers can also be attributed and assigned to the shoppers in the retail environment.

Still referring to the trust score module 400 of the computer system 102, the determiner 408 can also determine adjustments to the shopper's trust score based on activity that attributed to the shopper during subsequent trips to or interactions with the retail environment. Trust score adjustments can be made using the historic shopping activity data 428A-N and/or the shopper bag check history data 430A-N. The determiner 408 can also retrieve trust score adjustment rules 434A-N from the data store 104. The rules 434A-N can be used to determine how much to increase or decrease the shopper's trust score. Trust score adjustments can also be made using data received in real-time or near real-time from the bag check stations 116A-N and/or the employee devices 119A-N (e.g., a bag check during a current trip to the retail environment in which the contents of the bag match or do not match the shopper's receipt).

As an illustrative example, the determiner 408 can determine an amount of increase to the shopper's trust score based on the shopper engaging in more trustful activity (e.g., bag checks in which the contents of the shopper's bags match the shopper's receipts, increased frequency of online orders, pick up orders, drive up orders, etc.). The determiner 408 can also determine an amount of decrease to the shopper's trust score based on the shopper engaging in distrustful activity (e.g., bag checks in which the contents of the shoppers bags do not match the shopper's receipts). The trust score adjuster 410 can be configured to adjust the shopper's trust score based on determinations made by the determiner 408. Thus, the adjuster 410 can increase the shopper's trust score by the determined amount of increase or decrease. In some implementations, the adjuster 410 can determine the amount of increase or decrease to the shopper's trust score instead of the trust score determiner 408. Once the trust score is adjusted, the adjusted trust score can be stored as one of the trust score adjustment rules 434A-N in the data store 104 and in association with a shopper's objective identifier.

Still referring to the computer system 102, the bag check module 402 can be configured to determine when the shopper's bags should be checked. The module 402 can include a bag check frequency determiner 412 and a bag check determiner 414. The bag check frequency determiner 412 can be configured to determine and adjust a frequency at which the shopper's bags are to be checked. The determiner 412 can also use random offsetting techniques to make the bag checks less predictable. The determiner 412 can retrieve at least one of the historic shopper activity data 428A-N, shopper bag check history data 430A-N, and shopper trust score 432A-N from the data store 104 to be used in determining the bag check frequency for the particular shopper. The determiner 412 can also receive real-time or near real-time bag check data from the bag check stations 116A-N and/or the employee devices 119A-N, which can be used to adjust or otherwise determine the bag check frequency for the associated shopper. The bag check determiner 414 can receive the bag check frequency information from the bag check frequency determiner 412 and determine if the shopper is to be subject to a bag check during their current trip to the retail environment (or their next trip or trips to the retail environment).

The determination made by the bag check determiner 414 can then be transmitted to the output generator 404 or directly to the user device 110 the checkout station 108, and/or the bag check station 116 associated with the shopper. The output generator 404 can be configured to generate an indication on transaction data or receipts indicating whether the shopper is subject to a bag check during their current trip to the retail environment. The generator 404 can then transmit the transaction data or receipt with the indication to the user device 110, the checkout station 108, and/or the bag check station 116 associated with the shopper.

When the determination made by the determiner 414 is transmitted directly to the user device 110, the determination can be presented in a notification, text message, SMS message, or other alert/indication at the user device 110 and/or in a mobile application presented at the user device 110. The shopper can view the notification, which can indicate that the shopper is to undergo a bag check before they leave the retail environment. In some implementations, the notification can be transmitted and/or presented at the user device 110 of the shopper once the shopper completes the checkout process at the checkout station 108.

When the determination made by the determiner 414 is transmitted to the checkout station 108, the checkout station 108 can be configured to generate a receipt or other transaction data to be presented to the shopper indicating the determination. For example, if the determination is that the shopper is subject to a bag check, the checkout station 108 can generate an indication prompting the shopper to go to the bag check station 116 once they complete the checkout process at the checkout station 108. The indication can be presented on a display to the shopper at the checkout station 108. The indication can also be printed on a receipt once the checkout process is completed.

When the determination made by the determiner 414 is transmitted to the bag check station 116, the determination can be presented as an indication to the user on a display device of the bag check station 116. In some implementations, the shopper can go to the bag check station 116 after completing the checkout process and scan their receipt to determine whether the shopper is subject to a bag check before exiting the retail environment. When the shopper scans their receipt at the bag check station 116, the bag check station 116 can output/present the determination made by the determiner 414 to the shopper, where the determination made by the determiner 414 can be linked to the shopper's receipt based on a unique identifier associated with the shopper.

The communication interface 406 can be configured to provide communication between the devices and components described herein.

The checkout stations 108A-N can be positioned near exits of the retail environment and used by shoppers to perform a checkout process. The checkout stations 108A-N can include self-checkout stations in which shoppers scan items they are purchasing and complete the checkout process by providing their payment information to a point of sale terminal. The checkout stations 108A-N can also include manual checkout lanes in which employees of the retail environment scan items that a shopper is purchasing and then take payment from the shopper to complete the checkout process.

The checkout stations 108A-N can include scanning devices 420, display devices 422, input devices 424, output devices 426, and a point of sale terminal 427. The scanning devices 420 can include handheld devices for scanning labels, tags, or other identifiers attached to items in the retail environment. The scanning devices 420 can also include scanning beds or other scanners embedded into the checkout stations 108A-N. The scanning devices 420 can include imaging devices/cameras. The scanning devices 420 can also include RFID readers, barcode scanners, or other unique identifier scanners/readers. The display devices 422 can include touch screens, LCD screens, OLED screens, or other devices for displaying information to the shopper. The display devices 422 can display a current transaction of the shopper, which can be updated in real-time or near real-time as the shopper's items are scanned and added to their transaction. The input devices 424 can include keyboards, touch pads, touch screens, microphones, scanning devices, haptic devices, or other devices that can be used by the shopper to scan items, apply discounts/offers to their transactions, modify their transactions, pay for their transactions, and otherwise complete their transactions. The output devices 426 can include displays, speakers, haptic devices, or other devices for presenting information to the shopper about their transaction and the checkout process. The point of sale terminal 427 can be configured to present transaction data to the shopper and receive payment information to complete the checkout process.

In some implementations, one or more of the scanning devices 420, the display devices 422, the input devices 424, the output devices 426, and the point of sale terminal 427 can be a same device. For example, the point of sale terminal 427 can include the output devices 426 and the scanning devices 420 and the display devices 422 can include the input devices 424. As another example, the display devices 422 can include the point of sale terminal 427. As another example, the display devices 422 can include the input devices 424 and the output devices 426. As yet another example, the display devices 422 can include the scanning devices 420 and the point of sale terminal 427 can include the input devices 424 and the output devices 426. One or more other combinations of devices in the checkout station 108A-N can be implemented.

The user devices 110A-N can be used by the shoppers in the retail environment to scan items they wish to purchase, pay for items they purchase, and/or perform other functionality in the retail environment. The user devices 110A-N can include laptops, tablets, mobile phones, smartphones, wearable devices, or other devices that may be used by shoppers in the retail environment. The user devices 110A-N can include input and output devices as described throughout this disclosure. A mobile application associated with the retail environment can be presented at the user devices 110A-N and provide the shoppers with functionality to scan items they wish to purchase as they walk through the retail environment. As an illustrative example, a third party can scan items that have already been purchased by a shopper using the mobile application presented at the third party's user device 110. Because the shopper already paid for the items before the third party started shopping, the third party can leave the retail environment (potentially subject to a bag check) after scanning the items with their user device 110.

The bag check stations 116A-N can be used in the retail environment to perform the bag checks described herein. The bag check stations 116A-N can be positioned near an exit of the retail environment, as shown and described in FIG. 1C. The bag check stations 116A-N can be used by shoppers to automatically check the contents of their bags against their receipts without assistance from employees of the retail environment. In some implementations, employees of the retail environment can work at one or more of the bag check stations 116A-N to manually check the contents of shoppers' bags against their receipts.

The bag check stations 116A-N can include scanning devices 416 and display devices 418. In some implementations, after a shopper completes the checkout process at the checkout station 108, the shopper can go to the bag check station 116 and scan their receipt using the scanning device 416. The bag check station 116 can then check the scanned receipt to determine whether the shopper is subject to a bag check before they exit the retail environment. Results from this determination can be presented/outputted at the display device 418. The results presented to the shopper can instruct the shopper to go to another area where their bags will be checked before exiting the retail environment. In some implementations, the another area can include the bag check station 116. The results presented to the shopper can also instruct the shopper to simply exit the retail environment through a normal/typical exit of the retail environment that does not include any bag check area or the bag check stations 116A-N. The scanning device 416 can be similar or the same as any of the other scanning devices described herein. Similarly, the display device 418 can be similar or the same as any other display devices described herein.

The employee devices 119A-N can be similar to or the same as the user devices 110A-N. The employee devices 119A-N can include input devices, output devices, and one or more scanning devices, as described throughout this disclosure. The employee devices 119A-N can be used by the employees in the retail environment to perform bag checks before shoppers exit the retail environment. For example, as shown and described in FIG. 1A, the employees can be in a bag check area. When a shopper enters the bag check area before exiting the retail environment, an employee can use their employee device 119 to scan the shopper's receipt and/or scan/review items in the shopper's bags. The employee can provide input to the employee device 119 indicating whether the items in the shopper's bags match the items on the shopper's receipt. If there is a mismatch between items in the shopper's bags and the receipt, the employee can also record which items are found in the bags but not on the receipt. The input provided at the employee device 119 can then be stored in the data store 104 as the shopper bag check history data 430A-N and/or transmitted to the computer system 102 to be used in determining adjustments to the shopper's trust score and/or adjustments to the frequency of bag checks associated with the shopper.

Figure 5:
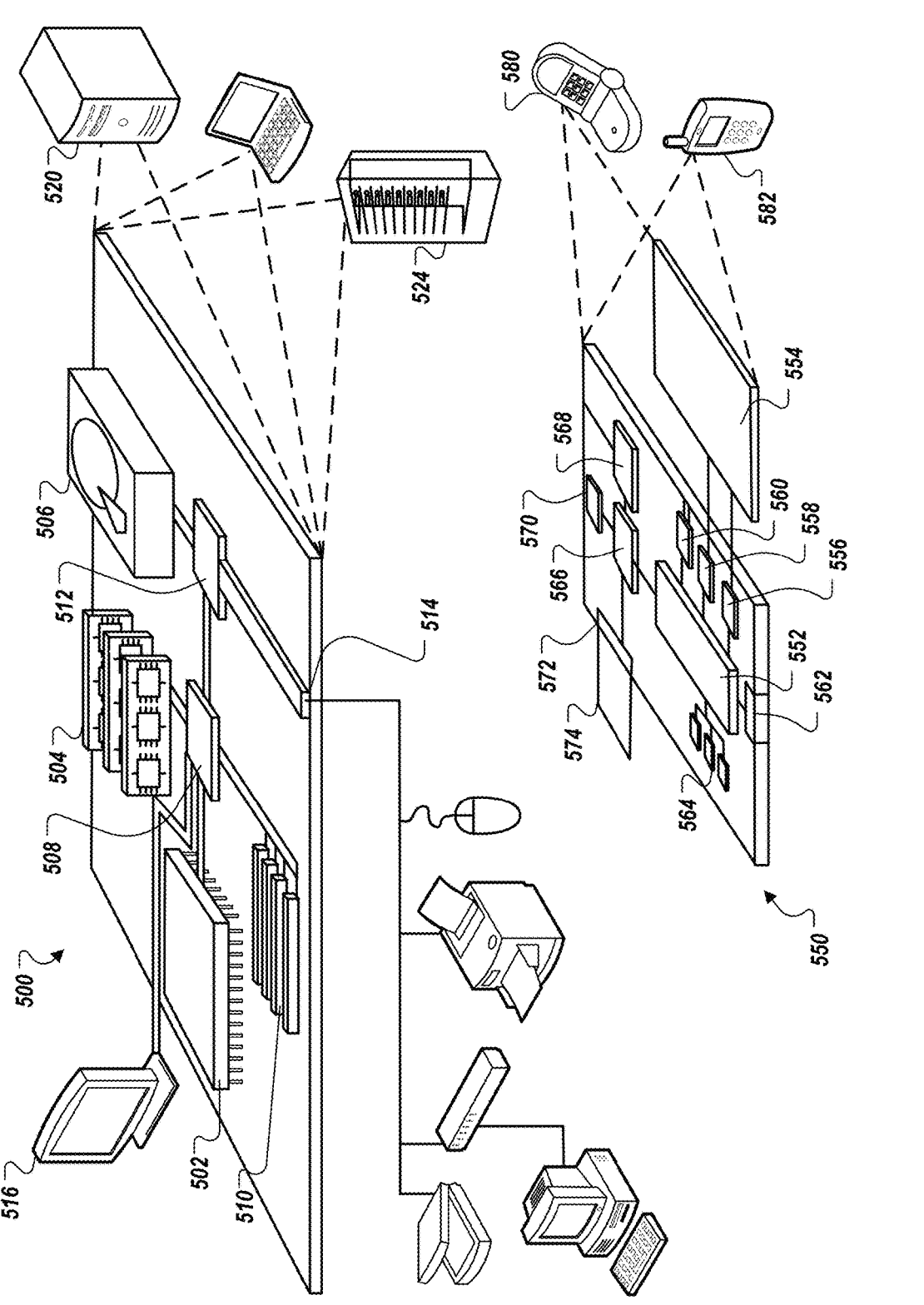
FIG. 5 is a schematic diagram that shows an example of a computing device and a mobile computing device.

FIG. 5 shows an example of a computing device 500 and an example of a mobile computing device that can be used to implement the techniques described here. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and can be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multiprocessor system).

The memory 504 stores information within the computing device 500. In some implementations, the memory 504 is a volatile memory unit or units. In some implementations, the memory 504 is a non-volatile memory unit or units. The memory 504 can also be another form of computer-readable medium, such as a magnetic or optical disk.

The storage device 506 is capable of providing mass storage for the computing device 500. In some implementations, the storage device 506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which can accept various expansion cards (not shown). In the implementation, the low-speed interface 512 is coupled to the storage device 506 and the low-speed expansion port 514. The low-speed expansion port 514, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 500 can be implemented in a number of different forms, as shown in the figure. For example, it can be implemented as a standard server 520, or multiple times in a group of such servers. In addition, it can be implemented in a personal computer such as a laptop computer 522. It can also be implemented as part of a rack server system 524. Alternatively, components from the computing device 500 can be combined with other components in a mobile device (not shown), such as a mobile computing device 550. Each of such devices can contain one or more of the computing device 500 and the mobile computing device 550, and an entire system can be made up of multiple computing devices communicating with each other.

The mobile computing device 550 includes a processor 552, a memory 564, an input/output device such as a display

554, a communication interface 566, and a transceiver 568, among other components. The mobile computing device 550 can also be provided with a storage device, such as a micro-drive or other device, to provide additional storage. Each of the processor 552, the memory 564, the display 554, the communication interface 566, and the transceiver 568, are interconnected using various buses, and several of the components can be mounted on a common motherboard or in other manners as appropriate.

The processor 552 can execute instructions within the mobile computing device 550, including instructions stored in the memory 564. The processor 552 can be implemented as a chipset of chips that include separate and multiple analog and digital processors. The processor 552 can provide, for example, for coordination of the other components of the mobile computing device 550, such as control of user interfaces, applications run by the mobile computing device 550, and wireless communication by the mobile computing device 550.

The processor 552 can communicate with a user through a control interface 558 and a display interface 556 coupled to the display 554. The display 554 can be, for example, a TFT (Thin-Film-Transistor Liquid Crystal Display) display or an OLED (Organic Light Emitting Diode) display, or other appropriate display technology. The display interface 556 can comprise appropriate circuitry for driving the display 554 to present graphical and other information to a user. The control interface 558 can receive commands from a user and convert them for submission to the processor 552. In addition, an external interface 562 can provide communication with the processor 552, so as to enable near area communication of the mobile computing device 550 with other devices. The external interface 562 can provide, for example, for wired communication in some implementations, or for wireless communication in other implementations, and multiple interfaces can also be used.

The memory 564 stores information within the mobile computing device 550. The memory 564 can be implemented as one or more of a computer-readable medium or media, a volatile memory unit or units, or a non-volatile memory unit or units. An expansion memory 574 can also be provided and connected to the mobile computing device 550 through an expansion interface 572, which can include, for example, a SIMM (Single In Line Memory Module) card interface. The expansion memory 574 can provide extra storage space for the mobile computing device 550, or can also store applications or other information for the mobile computing device 550. Specifically, the expansion memory 574 can include instructions to carry out or supplement the processes described above, and can include secure information also. Thus, for example, the expansion memory 574 can be provide as a security module for the mobile computing device 550, and can be programmed with instructions that permit secure use of the mobile computing device 550. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 can communicate wirelessly through the communication interface 566, which can include digital signal processing circuitry where necessary. The communication interface 566 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 568 using a radio-frequency. In addition, short-range communication can occur, such as using a Bluetooth, WiFi, or other such transceiver (not shown). In addition, a GPS (Global Positioning System) receiver module 570 can provide additional navigation- and location-related wireless data to the mobile computing device 550, which can be used as appropriate by applications running on the mobile computing device 550.

The mobile computing device 550 can also communicate audibly using an audio codec 560, which can receive spoken information from a user and convert it to usable digital information. The audio codec 560 can likewise generate audible sound for a user, such as through a speaker, e.g., in a handset of the mobile computing device 550. Such sound can include sound from voice telephone calls, can include recorded sound (e.g., voice messages, music files, etc.) and can also include sound generated by applications operating on the mobile computing device 550.

The mobile computing device 550 can be implemented in a number of different forms, as shown in the figure. For example, it can be implemented as a cellular telephone 580. It can also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A computer-implemented method for determining whether to check a bag of a shopper based on a shopper trust score in a retail environment, the computer-implemented method executed by one or more processors and memory storing instructions for execution of operations in a trust score module and a bag check module, the method comprising:

receiving, from a checkout station during a checkout process, shopper information including an identifier associated with a shopper;

retrieving, from a data store, bag checkout history data associated with the shopper based on the identifier, wherein the bag checkout history data includes a shopper trust score, a bag-check frequency value, and trust score adjustment rules;

determining, based on executing the instructions stored in memory by the trust score module, a weighted probability score for the shopper based on the shopper trust score and one or more shopper trust score groupings;

retrieving, based on executing the instructions stored in memory by the bag check module, a random value from a random number generator;

determining, based on based on executing the instructions stored in memory by the bag check module, whether to perform a bag check based on the random value exceeding a threshold derived from the weighted probability score;

generating bag check instructions based on the determination that the bag check is to be performed on the shopper;

transmitting the bag check instructions to at least one of (i) the checkout station to cause the checkout station to automatically print an indication on a transaction receipt of the shopper, wherein the indication causes the shopper to proceed to a bag check station before the shopper exits the retail environment during the current shopping experience (ii) a user device of the shopper to cause the user device to display an indication to cause the shopper to proceed to a bag check station before the shopper exits the retail environment during the current shopping experience, or (iii) a device associated with the bag check station located between the checkout station and an exit of the retail environment to cause the device associated with the bag check station to initiate an automated bag check at the bag check station in response to the shopper proceeding to the bag check station before exiting the retail environment during the current shopping experience;

initiating, based on transmitting the bag check instructions, an automated bag check at the bag check station, wherein the automated bag check comprises:

associating, based on scanning at the bag check station an identifier associated with the transaction receipt, the shopper's transaction receipt with the current shopping experience, receiving, from at least one of (i) an RFID reader, (ii) an image sensor, or (iii) a weight sensor at the bag check station, item identification signals associated with content of the shopper's bag, and determining whether at least a threshold quantity of the content of the shopper's bag matches transaction data on the shopper's transaction receipt, wherein the determining comprises comparing the item identification signals to the transaction data on the transaction receipt;

dynamically adjusting, based on executing the instructions stored in the memory by the trust score module, the shopper trust score in a process that comprises:

determining, based on a determination that (i) the threshold quantity of content of the shopper's bag matches the transaction data on the transaction receipt of the shopper from the checkout process and (ii) a drive up orders frequency in the bag checkout history data is more than a threshold drive up order frequency, an amount to increase the shopper trust score, and increasing the shopper trust score by the amount of increase to generate an adjusted shopper trust score;

dynamically adjusting, based on executing the instructions stored in the memory by the bag check module and based on the adjusted shopper trust score, the frequency for checking the shopper's bag during subsequent shopping experiences, wherein dynamically adjusting the frequency comprises increasing the frequency by a first amount based on a determination that a first threshold quantity of the content of the shopper's bag does not match transaction data on the shopper's transaction receipt, and wherein dynamically adjusting the frequency comprises decreasing the frequency by a second amount that is smaller than the first amount based on a determination that a second threshold quantity of the content of the shopper's bag matches transaction data on the shopper's transaction receipt; and returning the adjusted shopper trust score and the adjusted frequency for checking the shopper's bag during the subsequent shopping experiences.

2. The method of claim 1 further comprising presenting, at a user device of an employee in the retail environment, the bag check instructions including an indication to check the shopper's bag before the shopper exits the retail environment.

3. The method of claim 1, wherein returning the bag check instructions comprises generating an indication on the receipt that instructs the shopper to go through the bag check station before exiting the retail environment.

4. The method of claim 1, wherein adjusting the frequency of bag checks further comprises decreasing the frequency of bag checks by a third amount based on a determination that the adjusted trust score is greater than a threshold trust score value.

5. A system for determining whether to check a bag of a shopper based on a shopper trust score in a retail environment, the system comprising:

a checkout station having at least a scanning device and a display, the checkout station configured to perform a checkout process in a retail environment;

a bag check station having at least a scanning device and configured to be used to perform a bag check process after the checkout process; and a computer system configured to (i) receive information from the checkout station and the bag check station and (ii) determine whether to perform a bag check on a shopper before the shopper exits the retail environment, the computer system performing operations comprising:

receiving, from the checkout station during the checkout process, shopper information including an identifier associated with a shopper;

retrieving, from a data store, bag checkout history data associated with the shopper based on the identifier, wherein the bag checkout history data includes a shopper trust score, a bag-check frequency value, and trust score adjustment rules;

determining, based on executing the instructions stored in memory by the trust score module, a weighted probability score for the shopper based on the shopper trust score and one or more shopper trust score groupings;

retrieving, based on executing the instructions stored in memory by the bag check module, a random value from a random number generator;

determining, based on based on executing the instructions stored in memory by the bag check module, whether to perform a bag check based on the random value exceeding a threshold derived from the weighted probability score;

generating bag check instructions based on the determination that the bag check is to be performed on the shopper;

transmitting the bag check instructions to at least one of (i) the checkout station to cause the checkout station to automatically print an indication on a transaction receipt of the shopper, wherein the indication causes the shopper to proceed to a bag check station before the shopper exits the retail environment during the current shopping experience (ii) a user device of the shopper to cause the user device to display an indication to cause the shopper to proceed to a bag check station before the shopper exits the retail environment during the current shopping experience, or (iii) a device associated with the bag check station located between the checkout station and an exit of the retail environment to cause the device associated with the bag check station to initiate an automated bag check at the bag check station in response to the shopper proceeding to the bag check station before exiting the retail environment during the current shopping experience;

initiating, based on transmitting the bag check instructions an automated bag check at the bag check station, wherein the automated bag check comprises:

associating, based on scanning at the bag check station an identifier associated with the transaction receipt, the shopper's transaction receipt with the current shopping experience, receiving, from at least one of (i) an RFID reader, (ii) an image sensor, or (iii) a weight sensor at the bag check station, item identification signals associated with content of the shopper's bag, and determining whether at least a threshold quantity of the content of the shopper's bag matches transaction data on the shopper's transaction receipt, wherein the determining comprises comparing the item identification signals to the transaction data on the transaction receipt;

dynamically adjusting based on executing the instructions stored in the memory by the trust score module, the shopper trust score in a process that comprises:

determining, based on a determination that (i) the threshold quantity of content of the shopper's bag matches the transaction data on the transaction receipt of the shopper from the checkout process and (ii) a drive up orders frequency in the bag checkout history data is more than a threshold drive up order frequency, an amount to increase the shopper trust score, and increasing the shopper trust score by the amount of increase to generate an adjusted shopper trust score;

dynamically adjusting, based on executing the instructions stored in the memory by the bag check module and based on the adjusted shopper trust score, the frequency for checking the shopper's bag during subsequent shopping experiences, wherein dynamically adjusting the frequency comprises increasing the frequency by a first amount based on a determination that a first threshold quantity of the content of the shopper's bag does not match transaction data on the shopper's transaction receipt, and wherein dynamically adjusting the frequency comprises decreasing the frequency by a second amount that is smaller than the first amount based on a determination that a second threshold quantity of the content of the shopper's bag matches transaction data on the shopper's transaction receipt; and returning the adjusted shopper trust score and the adjusted frequency for checking the shopper's bag during the subsequent shopping experiences.

6. The system of claim 5, wherein the bag check station is located before the exit of the retail environment and after the checkout station.

* * * * *